US011861659B2

(12) United States Patent
Jeong et al.

(10) Patent No.: US 11,861,659 B2
(45) Date of Patent: Jan. 2, 2024

(54) ELECTRONIC DEVICE AND METHOD OF OPERATING THE SAME

(71) Applicant: SAMSUNG ELECTRONICS CO., LTD., Suwon-si (KR)

(72) Inventors: Dahee Jeong, Suwon-si (KR); Jongin Lee, Suwon-si (KR); Kilsoo Choi, Suwon-si (KR); Sehyun Kim, Suwon-si (KR); Kwansik Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 230 days.

(21) Appl. No.: 17/137,624

(22) Filed: Dec. 30, 2020

(65) Prior Publication Data

US 2021/0209640 A1    Jul. 8, 2021

(30) Foreign Application Priority Data

Jan. 7, 2020 (KR) .................. 10-2020-0002141

(51) Int. Cl.
*G06Q 30/02* (2023.01)
*G06Q 30/0251* (2023.01)
(Continued)

(52) U.S. Cl.
CPC ....... *G06Q 30/0252* (2013.01); *G06F 3/1454* (2013.01); *H04N 21/812* (2013.01)

(58) Field of Classification Search
CPC .............. G06F 3/1454; G06Q 30/0251; G06Q 30/0255; G06Q 30/0261; G06Q 30/0267; G06Q 30/0269; G06Q 30/0271
See application file for complete search history.

(56) References Cited

U.S. PATENT DOCUMENTS 8,069,081 B2   11/2011   Neufeld et al.
10,484,526 B2   11/2019   Lee et al.
(Continued)

FOREIGN PATENT DOCUMENTS

CN   102595217 A   7/2012
CN   107851270 A   3/2018
(Continued)

OTHER PUBLICATIONS

Method and System for Selective Mirroring of Content from Mobile Devices; IPCOM000253928D IP.com Electronic Publication Date: May 16, 2018.*

(Continued)

*Primary Examiner* — David J Stoltenberg
(74) *Attorney, Agent, or Firm* — Sughrue Mion, PLLC

(57) ABSTRACT

An electronic device for displaying a target advertisement which displays a content screen on a display based on content data received from an external server, transmits information about the electronic device to the external server for a target advertisement, and receives first target advertisement information determined based on the information about the electronic device from the external server and displays a target advertisement by using the received first target advertisement information. Also, the electronic device performs screen mirroring such that at least a portion of the content screen is displayed on an external device, transmits information about the external device connected by the screen mirroring to the external server for a target advertisement, receives second target advertisement information determined based on the information about the external device from the external server, and displays a target advertisement by using the received second target advertisement information while performing the screen mirroring.

28 Claims, 18 Drawing Sheets

(51) Int. Cl.
*G06F 3/14* (2006.01)
*H04N 21/81* (2011.01)

(56) References Cited

U.S. PATENT DOCUMENTS

| | | | |
|---|---|---|---|
| 2008/0010501 A1* | 1/2008 | Bucher | H04L 67/1095 714/6.11 |
| 2009/0019492 A1* | 1/2009 | Grasset | H04N 21/4325 348/E7.071 |
| 2011/0106910 A1 | 5/2011 | Grasset | |
| 2012/0158511 A1 | 6/2012 | Lucero et al. | |
| 2014/0372216 A1 | 12/2014 | Nath et al. | |
| 2014/0372430 A1 | 12/2014 | Sitruk et al. | |
| 2015/0097757 A1* | 4/2015 | Bang | G06F 3/1454 345/2.2 |
| 2015/0326707 A1* | 11/2015 | Lee | H04M 1/72409 455/566 |
| 2016/0179455 A1* | 6/2016 | Liu | G06Q 30/0267 345/2.2 |
| 2016/0253142 A1 | 9/2016 | Choi et al. | |
| 2016/0358216 A1* | 12/2016 | Glover | G06Q 30/0267 |
| 2017/0060518 A1* | 3/2017 | Hong | G06F 3/0482 |
| 2017/0311025 A1* | 10/2017 | Kim | G06F 3/1454 |
| 2018/0285897 A1 | 10/2018 | Seo et al. | |
| 2018/0332330 A1* | 11/2018 | Grasset | H04L 67/1095 |
| 2019/0073180 A1* | 3/2019 | Nunan | H04L 67/131 |
| 2020/0057589 A1* | 2/2020 | Jo | H04L 65/40 |
| 2020/0379707 A1* | 12/2020 | Kwon | G06F 3/1454 |
| 2021/0064324 A1* | 3/2021 | Liao | H04W 4/80 |

FOREIGN PATENT DOCUMENTS

| | | | | |
|---|---|---|---|---|
| CN | 110337815 A | | 10/2019 | |
| EP | 3 028 465 | | 2/2015 | |
| EP | 3 139 264 A2 | | 3/2017 | |
| EP | 3 171 309 A1 | | 5/2017 | |
| EP | 3 376 771 A1 | | 9/2018 | |
| EP | 3 388 938 A1 | | 10/2018 | |
| EP | 3388938 A1 | * | 10/2018 | |
| JP | 2014-203045 A | | 10/2014 | |
| KR | 2014-0121736 A | * | 9/2014 | G06F 13/14 |
| KR | 10-2015-0113370 A | | 10/2015 | |
| KR | 10-1710733 B1 | | 2/2017 | |
| KR | 10-2018-0111385 A | | 10/2018 | |
| WO | 2017/115892 A1 | | 7/2017 | |

OTHER PUBLICATIONS

Classification of N-Screen Services, Scenarios and its Standardization; Yoon et al., ICACT Transactions on Advanced Communications Technology (TACT) vol. 2, Issue 3, May 2013.*
Communication dated May 27, 2021, issued by the European Patent Office in counterpart European Application No. 20216993.4.
Communication dated Mar. 31, 2021, issued by the International Searching Authority in counterpart International Application No. PCT/KR2020/019034 (PCT/ISA/220, 210, 237).
Communication dated Mar. 16, 2023, issued by the European Patent Office in counterpart European Application No. 20216993.4.
Communication dated Aug. 24, 2023, issued by the China National Intellectual Property Administration in counterpart Chinese Application No. 202110019781.9.

* cited by examiner

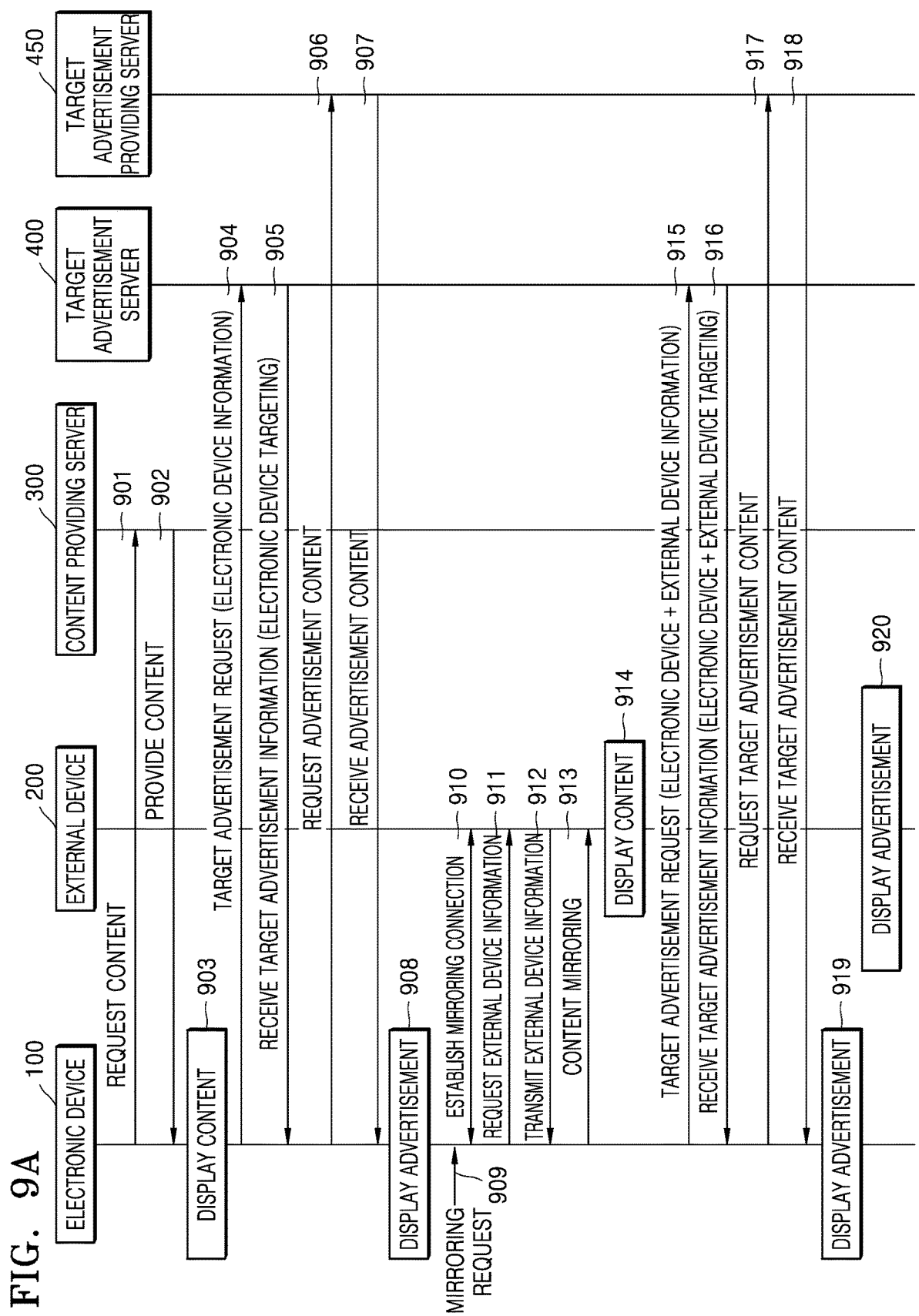

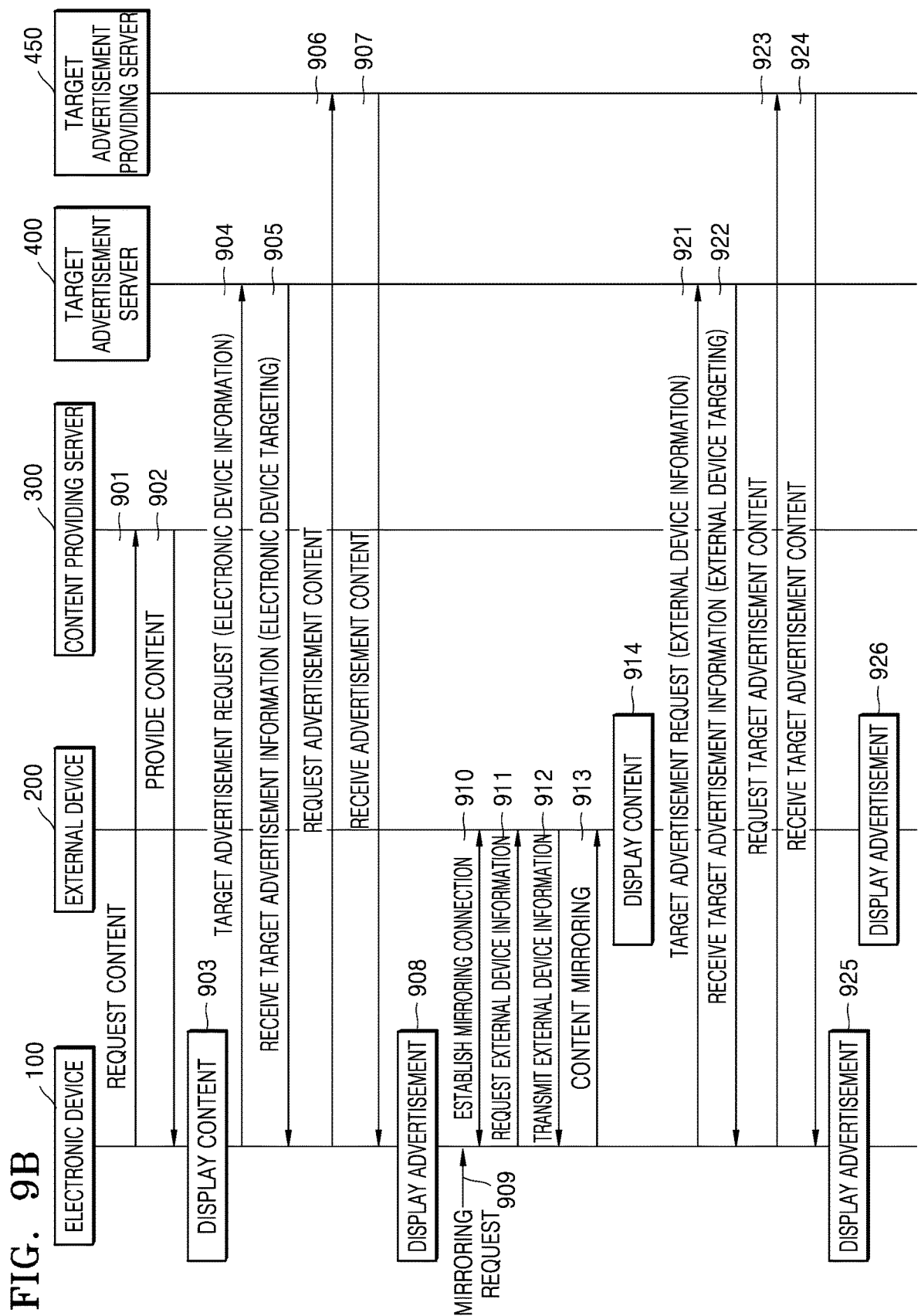

ELECTRONIC DEVICE AND METHOD OF OPERATING THE SAME

CROSS-REFERENCE TO RELATED APPLICATION

This application is based on and claims priority under 35 U.S.C. § 119 to Korean Patent Application No. 10-2020-0002141, filed on Jan. 7, 2020, in the Korean Intellectual Property Office, the disclosure of which is incorporated by reference herein in its entirety.

BACKGROUND

1. Field

The disclosure relates to an electronic device and a method of operating the same, and more particularly, to an electronic device for providing a target advertisement to a user and a method of operating the same.

2. Description of Related Art

Targeted advertising refers to a type of online advertising in which advertisers provide advertisements in accordance with the characteristics of users or customers. The characteristics of the users or customers may include the users' genders, ages, income levels, lifestyles, and actions on the internet, such as clicks. As such, targeted advertising refers to providing consumers having strong preferences in relation to certain characteristics, with advertisements that better match the strong preferences.

Recently, a need has arisen to have targeted advertising more personalized and refined according to a change in the user environment in which personalized smart devices, mobile devices, and various smart devices are connected and used.

SUMMARY

Provided are an electronic device capable of providing a target advertisement more finely targeted by reflecting a user's content viewing environment and a method of operating the same.

Additional aspects will be set forth in part in the description which follows and, in part, will be apparent from the description, or may be learned by practice of the presented embodiments of the disclosure.

According to an embodiment of the disclosure, an electronic device includes a communication interface, a memory storing one or more instructions, and a processor configured, by executing the one or more instructions stored in the memory, to display a content screen on a display of the electronic device based on content data received from an external server, transmit information about the electronic device to the external server for a target advertisement, receive first target advertisement information determined based on the information about the electronic device from the external server and display a target advertisement by using the received first target advertisement information, perform screen mirroring such that at least a portion of the content screen is displayed on an external device, transmit information about the external device connected by the screen mirroring to the external server, receive second target advertisement information determined based on the information about the external device from the external server, and display a target advertisement by using the received second target advertisement information while performing the screen mirroring.

According to an embodiment of the disclosure, the processor may be further configured, by executing the one or more instructions, to transmit the information about the electronic device to the external server in addition to the information about the external device, and the second target advertisement information may be determined based on the information about the electronic device in addition to the information about the external device.

According to an embodiment of the disclosure, the information about the electronic device may include device information of the electronic device and information about a user of the electronic device, and the information about the external device may include device information of the external device and information about a user of the external device.

According to an embodiment of the disclosure, each of the information about the user of the electronic device and the information about the user of the external device may include at least one of viewing history information, preference information, or user account information.

According to an embodiment of the disclosure, each of the device information of the electronic device and the device information of the external device may include at least one of country information, language information, device identification (ID), or Internet protocol (IP) information.

According to an embodiment of the disclosure, the second target advertisement information may include information for accessing target advertisement content targeting a user of the external device, and the processor may be further configured, by executing the one or more instructions, to access a server providing the target advertisement content by using the information for accessing the target advertisement content and receive the target advertisement content from the server providing the target advertisement content.

According to an embodiment of the disclosure, the external server may include a target advertisement server providing the target advertisement information independently from a content providing server providing the content.

According to an embodiment of the disclosure, the external server may include a content providing server providing the content.

According to an embodiment of the disclosure, the processor may be further configured, by executing the one or more instructions, to transmit, when the external device connected by the screen mirroring is changed, information about the changed external device to the external server.

According to an embodiment of the disclosure, the processor may be further configured, by executing the one or more instructions, to transmit content screen including a target advertisement based on the second target advertisement information to the external device by screen mirroring, receive a user input for selecting an item related to the target advertisement based on the second target advertisement information from the external device, and transmit information for providing a result corresponding to the user input to the external device.

According to another embodiment of the disclosure, a system for providing a target advertisement includes a first device, a second device, and a target advertisement server, wherein the first device is configured to display a content screen on a display of the first device based on content data received from a content providing server, and provide the content screen to the second device by performing screen mirroring, the second device is configured to receive the content screen from the first device and display the content screen by screen mirroring, and the target advertisement server is configured to provide target advertisement information targeting each of the first and second devices, wherein the first device is further configured to transmit information about the second device connected by the screen mirroring to the target advertisement server, and the target advertisement server is further configured to determine target advertisement information targeting the second device based on the information about the second device and transmit the determined target advertisement information to the first device.

According to an embodiment of the disclosure, the first device may be further configured to obtain a target advertisement corresponding to the target advertisement information received from the target advertisement server by using the target advertisement information, display the obtained target advertisement at an advertisement display point during execution of the content, and transmit content screen including the displayed target advertisement to the second device by screen mirroring.

According to an embodiment of the disclosure, the second device may be further configured to display content screen including a target advertisement received from the first device by screen mirroring, receive a user input for selecting an item related to the target advertisement, transmit a signal corresponding to the user input to the first device, receive information for providing a result corresponding to the user input from the first device, and perform an operation corresponding to the user input by using the information.

According to another embodiment of the disclosure, a method of operating an electronic device includes displaying a content screen on a display of the electronic device based on content data received from an external server, transmitting information about the electronic device to the external server for a target advertisement, receiving first target advertisement information determined based on the information about the electronic device from the external server and displaying a target advertisement by using the received first target advertisement information, performing screen mirroring such that at least a portion of the content screen is displayed on an external device, transmitting information about the external device connected by the screen mirroring to the external server, receiving second target advertisement information determined based on the information about the external device from the external server, and displaying a target advertisement by using the received second target advertisement information while performing the screen mirroring.

According to another embodiment of the disclosure, a computer program product includes a non-transitory computer-readable recording medium having recorded thereon a program for performing a method of operating an electronic device, and the method includes display a content screen on a display of the electronic device based on content data received from an external server, transmitting information about the electronic device to the external server for a target advertisement, receiving first target advertisement information determined based on the information about the electronic device from the external server and displaying a target advertisement by using the received first target advertisement information, performing screen mirroring such that at least a portion of the content screen is displayed on an external device, transmitting information about the external device connected by the screen mirroring to the external server, receiving second target advertisement information determined based on the information about the external device from the external server, and displaying a target advertisement by using the received second target advertisement information while performing the screen mirroring.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9A illustrates an example of a flowchart of operations in an active mode in which an electronic device actively requests a target advertisement server for a target advertisement, according to an embodiment of the disclosure;

FIG. 9B illustrates another example of a flowchart of operations in an active mode in which an electronic device actively requests a target advertisement server for a target advertisement, according to an embodiment of the disclosure;

DETAILED DESCRIPTION

Figure 1:
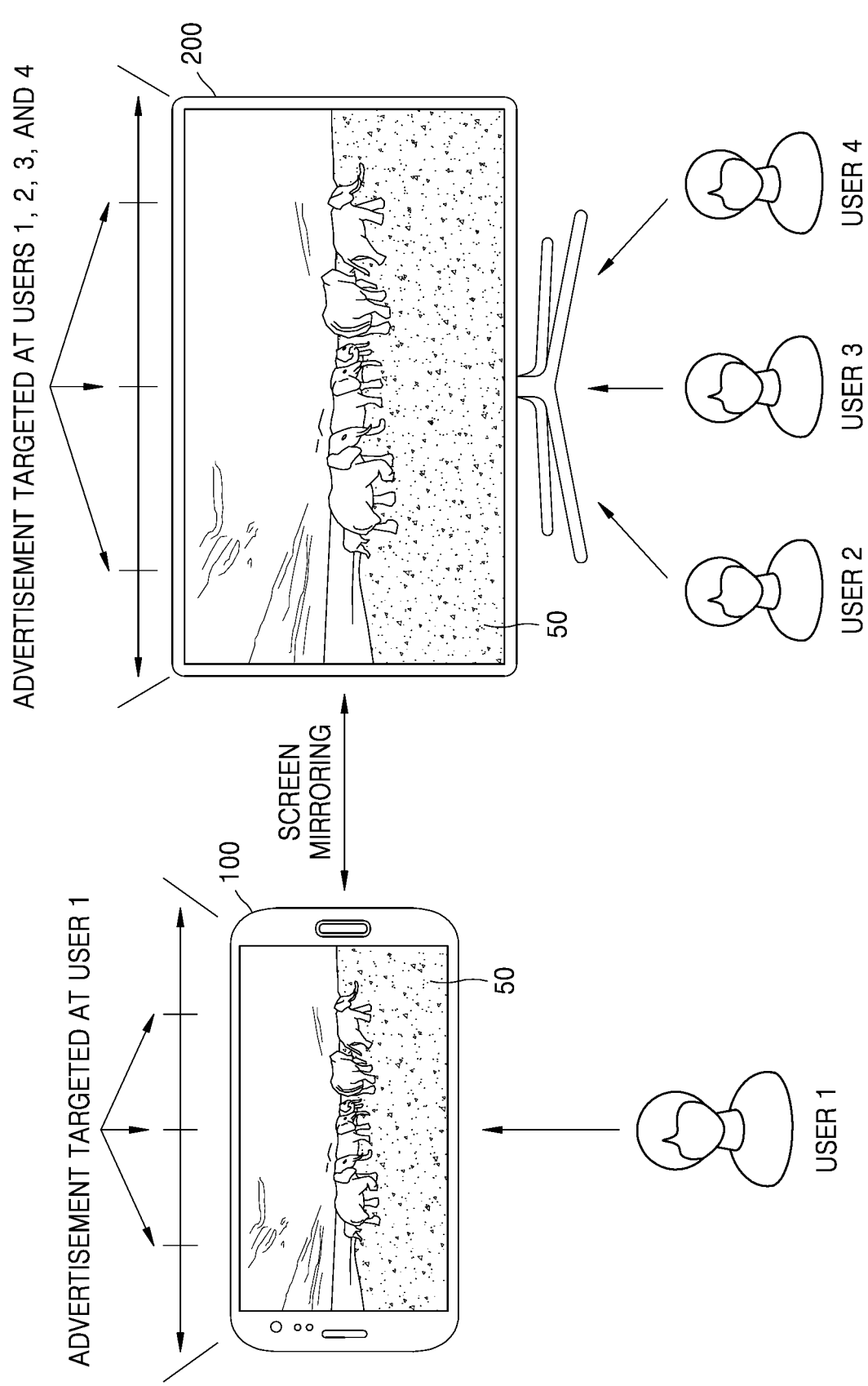
FIG. 1 is a reference diagram for describing a concept of a method of providing a target advertisement by reflecting a user environment, according to various embodiments of the disclosure.

Terms used herein will be briefly described and then the disclosure will be described in detail.

The terms used herein are those general terms currently widely used in consideration of functions in the disclosure, but the terms may vary according to the intentions of those of ordinary skill in the art, precedents, or new technology in the art. Also, in some cases, there may be terms that are optionally selected by the applicant, and the meanings thereof will be described in detail in the corresponding portions of the disclosure. Thus, the terms used herein should be understood not as simple names but based on the meanings of the terms and the overall description of the disclosure.

Throughout the specification, when something is referred to as "including" an element, another element may be further included unless specified otherwise. Also, as used herein, the terms such as "units" and "modules" may refer to units that perform at least one function or operation, and the units may be implemented as hardware or software or a combination of hardware and software.

Hereinafter, embodiments of the disclosure will be described in detail with reference to the accompanying drawings so that those of ordinary skill in the art may easily implement the embodiments. However, the disclosure may be embodied in many different forms and should not be construed as being limited to the embodiments set forth herein. In addition, portions irrelevant to the description of the disclosure will be omitted in the drawings for a clear description of the disclosure, and like reference numerals will denote like elements throughout the specification.

Throughout the disclosure, the expression "at least one of a, b or c" indicates only a, only b, only c, both a and b, both a and c, both b and c, all of a, b, and c, or variations thereof.

As used herein, the term "user" may refer to a person controlling the function or operation of an image display device by using a controller and may include a viewer, a manager, or an installer.

FIG. 1 is a reference diagram for describing a concept of a method of providing a target advertisement by reflecting a user environment, according to various embodiments of the disclosure.

Referring to FIG. 1, an electronic device 100, for example, a mobile device, may play and display content 50 according to an operation of a user 1. The electronic device 100 may provide an advertisement targeted at the user 1 at least once during the play of the content 50. When the electronic device 100 is a mobile device, because the mobile device is usually used not by a plurality of users but by an individual user operating the mobile device, the electronic device 100 may provide a target advertisement customized to the user 1 operating the electronic device 100. The advertisement targeted at the user 1 may include, for example, an advertisement determined based on demographic characteristics such as the user 1's race, economic status, gender, age, education level, income level, or employment status, psychographic characteristics such as the user 1's value, personality, attitude, opinion, lifestyle, or interest, or characteristics such as the user 1's browser history, purchase history, or action variables including recent actions according to the user 1's use. For example, when the user 1 is a mid-forties man, the advertisement targeted at the user 1 may include a car advertisement, a golf wear advertisement, or the like in consideration of the user 1's income, interest, or the like.

As such, at some point while the electronic device 100 plays and displays the content 50, screen data of the electronic device 100 may be screen-mirrored on an external device 200, for example, a display device, and displayed on the screen of the external device 200 as it is. Screen mirroring may refer to technology for allowing screen data displayed on the display of one device to be displayed on the display of one or more other devices as it is. Screen mirroring may also be referred to as screen streaming.

By the screen mirroring, the content 50 displayed on the display of the electronic device 100 may be displayed on the display of the external device 200 as it is. Thus, by screen mirroring, not only the user 1 but also a user 2, a user 3, and a user 4 may enjoy the same content 50, which is displayed on the electronic device 100, through the external device 200. Thus, after the screen mirroring, the range of users viewing the content 50 may be expanded to include the user 2, the user 3, and the user 4 using the external device 200, together with the user 1 using the electronic device 100.

Thus, because an advertisement targeting the user 1 of the electronic device 100 is sufficient before the screen mirroring but the range of users consuming the content 50 is changed or expanded after the screen mirroring, a method of providing a target advertisement in accordance with the range of users changed or expanded by the screen mirroring is provided according to various embodiments of the disclosure. That is, after the screen mirroring, an advertisement targeting the user 1, the user 2, the user 3, and the user 4 consuming the content may be provided. For example, the advertisement targeted at the users 1, 2, 3, and 4 may include, for example, an advertisement determined based on demographic characteristics such as the users 1, 2, 3, and 4's race, economic status, gender, age, education level, income level, or employment status, psychographic characteristics such as the users 1, 2, 3, and 4's value, personality, attitude, opinion, lifestyle, or interest, or characteristics such as the users 1, 2, 3, and 4's browser history, purchase history, or action variables including recent actions according to the users 1, 2, 3, and 4's use. As another example, after the screen mirroring, an advertisement targeting the user 2, the user 3, and the user 4 consuming the content by receiving screen data by the screen mirroring may be provided.

For example, when the user 1 is a mid-forties man, a car advertisement, a golf wear advertisement, or the like may be provided as the advertisement targeted at the user 1 in consideration of the user 1's income, interest, or the like before the screen mirroring. When the users of the external device 200 include children after the screen mirroring, the target advertisement after the screen mirroring may include, for example, a toy advertisement or a snack advertisement targeting the children. As such, when the user consuming the content is changed or expanded by the screen mirroring or the like, a more flexible and finer target advertisement may be provided by adaptively targeting an advertisement in accordance with the changed or expanded user.

Figure 2:
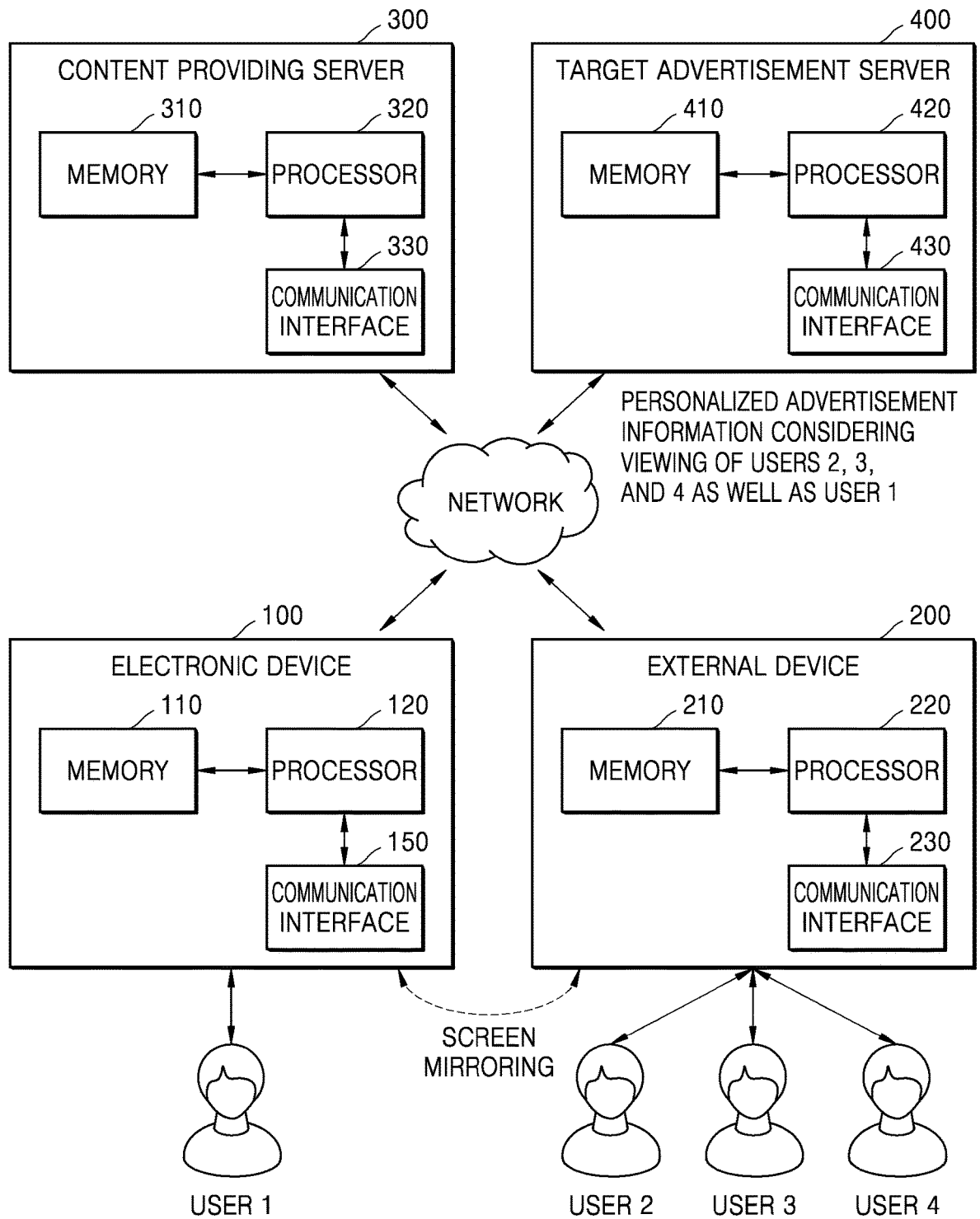
FIG. 2 illustrates an example of a system for providing a target advertisement, according to an embodiment of the disclosure.

FIG. 2 illustrates an example of a system for providing a target advertisement, according to an embodiment of the disclosure.

Referring to FIG. 2, the system may include an electronic device 100, an external device 200, a content providing server 300, and a target advertisement server 400.

The electronic device 100, the external device 200, the content providing server 300, and the target advertisement server 400 may communicate with each other through a wireless access network that is directly or indirectly coupled to a packet network, and the wireless access network may include a cellular network, a wireless local area network (WLAN), or the like.

The electronic device 100 may request the content providing server 300 for content in order to display the content according to a request of the user, for example, the user 1, and may receive and display the requested content. The electronic device 100 may provide information about the electronic device 100 including information about the user 1 to the content providing server 300 in order to display an advertisement targeted at the user 1 while displaying the content received from the content providing server 300 and may receive the advertisement targeted at the user 1 from the content providing server 300 and display the received advertisement (passive mode). Alternatively, the electronic device 100 may provide information about the electronic device 100 including information about the user 1 to the target advertisement server 400 in order to display an advertisement targeted at the user 1 while displaying the content received from the content providing server 300 and may receive the advertisement targeted at the user 1 from the target advertisement server 400 and display the received advertisement (active mode).

The electronic device 100 may establish a screen mirroring connection with the external device 200 through the network. Screen mirroring may refer to technology for allowing at least a portion of screen data displayed on the display of the electronic device 100 to be displayed on the display of the external device 200. The electronic device 100 and the external device 200 may display the same screen data in real time by screen mirroring. Thus, the range of users consuming the content may be expanded by the screen mirroring. For example, when the user of the electronic device 100 is the user 1 and the users of the external device 200 are the users 2, 3, and 4, because the user consuming the content displayed on the electronic device 100 is limited to the user 1 before the screen mirroring but the content displayed on the electronic device 100 may also be displayed on the external device 200 in the same manner by the screen mirroring, the range of users consuming the content may be expanded to the users 1, 2, 3, and 4.

Thus, when screen mirroring occurs as such, in order to provide a target advertisement in consideration of the users expanded by the screen mirroring, the electronic device 100 may provide not only information about the electronic device 100 including information about the user 1 but also information about the external device 200 including information about the users 2, 3, and 4 to the content providing server 300 or the target advertisement server 400. The electronic device 100 may request and receive the information about the users 2, 3, and 4 or the information about the external device 200 from the external device 200. Then, the content providing server 300 or the target advertisement server 400 may determine a target advertisement targeting not only the user 1 but also the users 2, 3, and 4 and provide the target advertisement to the electronic device 100. The electronic device 100 may display the target advertisement targeting the users 1, 2, 3, and 4 and provide the target advertisement targeting the users 1, 2, 3, and 4 to the external device 200 through screen mirroring such that the target advertisement may be displayed on the external device 200.

As another example, when screen mirroring occurs as such, in order to provide a target advertisement in consideration of the users of the external device 200 receiving screen data by screen mirroring, the electronic device 100 may provide information about the external device 200 including information about the users 2, 3, and 4 of the external device 200 to the content providing server 300 or the target advertisement server 400. The electronic device 100 may request and receive the information about the users 2, 3, and 4 or the information about the external device 200 from the external device 200. Then, the content providing server 300 or the target advertisement server 400 may determine a target advertisement targeting the users 2, 3, and 4 and provide the target advertisement to the electronic device 100. The electronic device 100 may display the target advertisement targeting the users 2, 3, and 4 and provide the target advertisement targeting the users 2, 3, and 4 to the external device 200 through screen mirroring such that the target advertisement may be displayed on the external device 200.

As such, when the range of users consuming the content is expanded or changed by screen mirroring, because the advertisements may be more finely provided by adaptively targeting the advertisements in accordance with the flexibly expanded or changed user range, the advertisers may maximize the advertising effect and the users may receive the better customized advertisements.

According to an embodiment of the disclosure, the electronic device 100 may include a memory 110, a processor 120, and a communication interface 150.

According to an embodiment of the disclosure, the memory 110 may store one or more programs for processing and controlling the operations of the processor 120 and may store data that is input to the electronic device 100 or output from the electronic device 100.

The memory 110 may include at least one type of storage medium from among flash memory type, hard disk type, multimedia card micro type, card type memory (e.g., SD and XD memories), random-access memory (RAM), static random-access memory (SRAM), read-only memory (ROM), electronically erasable programmable read-only memory (EEPROM), programmable read-only memory (PROM), magnetic memory, magnetic disk, and optical disk.

According to an embodiment of the disclosure, the processor 120 may control an overall operation of the electronic device 100. For example, by executing one or more instructions stored in the memory 110, the processor 120 may perform the functions of the electronic device 100 illustrated in FIGS. 1 to 17.

According to an embodiment of the disclosure, the processor 120 may establish a screen mirroring connection with the external device 200, transmit/receive a mirroring screen including content to/from the external device 200, and receive information about the external device 200 including information about one or more users using the external device 200 from the external device 200 connected by screen mirroring.

According to an embodiment of the disclosure, the processor 120 may transmit a content request to the content providing server 300 and receive the requested content from the content providing server 300. According to an example, the processor 120 may transmit information about the electronic device 100 and information about the external device 200 connected by screen mirroring to the content providing server 300 and receive a target advertisement targeted based on the information about the electronic device 100 and the information about the external device 200 from the content providing server 300. According to an example, the processor 120 may transmit information about the external device 200 connected by screen mirroring to the content providing server 300 and receive a target advertisement targeted based on the information about the external device 200 from the content providing server 300. Also, the processor 120 may transmit the received target advertisement to the external device 200 through the screen mirroring.

According to an embodiment of the disclosure, the processor 120 may transmit a content request to the content providing server 300 to receive content from the content providing server 300, transmit information about the electronic device 100 and information about the external device 200 connected by screen mirroring to the target advertisement server 400, and receive a target advertisement targeted based on the information about the electronic device 100 and the information about the external device 200 from the target advertisement server 400.

According to an embodiment of the disclosure, the processor 120 may transmit a content request to the content providing server 300 to receive content from the content providing server 300, transmit information about the external device 200 connected by screen mirroring to the target advertisement server 400, and receive a target advertisement targeted based on the information about the external device 200 from the target advertisement server 400.

According to an embodiment of the disclosure, when the electronic device 100 is connected to the external device 200 by screen mirroring, the processor 120 may transmit content source information for accessing the content displayed on a display of the electronic device 100 to the external device 200. Accordingly, upon receiving the content source information, the external device 200 may access the content providing server 300 to receive the corresponding content by using the content source information and transmit a target advertisement request including information about the external device 200 to the target advertisement server 400 to receive a target advertisement targeting the user of the external device 200.

The communication interface 150 may connect the electronic device 100 to the external device 200, the content providing server 300, and the target advertisement server 400 under the control of the processor 120.

The communication interface 150 may include one or a combination of a wireless LAN module, a Bluetooth module, and a wired Ethernet module corresponding to the performance and structure of the electronic device 100. The communication interface 150 may further include other short-range communication modules (e.g., Near Field Communication (NFC) and Bluetooth Low Energy (BLE)) in addition to Bluetooth.

In the example illustrated in FIG. 2, the electronic device 100 may include a display itself to directly display the data processed by the processor 120 on the display, or the electronic device 100 may transmit the data processed by the processor 120 to an electrically connected display device through the communication interface 150.

The electronic device 100 may include a set-top box, a digital video recorder (DVR), a receiver or similar customer premise equipment (CPE), a personal computer, a personal portable terminal, a smart phone, or the like.

The external device 200 may establish a screen mirroring connection with the electronic device 100 and display screen data received from the electronic device 100 by screen mirroring.

After establishing a connection with the electronic device 100 by screen mirroring, the external device 200 may provide information about the external device 200 including user information of the external device 200 to the electronic device 100 according to a request of the electronic device 100. The user information stored in the external device 200 may include information about one or more users.

The external device 200 may receive a target advertisement targeted based on information about the electronic device 100 and information about the external device 200 from the electronic device 100 and display the target advertisement by screen mirroring.

The external device 200 may transmit a request for source information of the content corresponding to the target advertisement to the electronic device 100 according to a user input for selecting the target advertisement while displaying the target advertisement and receive the source information of the content corresponding to the target advertisement from the electronic device 100. The external device 200 may access a server providing content by using the received source information of the content and receive the content corresponding to the target advertisement from the server. As such, even when the external device 200 receives screen data from the electronic device 100 by screen mirroring, when the user of the external device 200 selects the target advertisement from the actual screen data, the access to the content corresponding to the target advertisement may be performed by the external device 200. Accordingly, the user's convenience of using the external device may be improved because an operation related to the actual target advertisement is performed in the external device, and also, the user information may be more effectively managed because the history or result according to the operation related to the target advertisement is accumulated in the external device 200.

According to an embodiment of the disclosure, the external device 200 may include a memory 210, a processor 220, and a communication interface 230.

According to an embodiment of the disclosure, the memory 210 may store one or more programs for processing and controlling the operations of the processor 220 and may store data that is input to the external device 200 or output from the external device 200.

The memory 210 may include at least one type of storage medium from among flash memory type, hard disk type, multimedia card micro type, card type memory (e.g., SD and XD memories), random-access memory (RAM), static random-access memory (SRAM), read-only memory (ROM), electronically erasable programmable read-only memory (EEPROM), programmable read-only memory (PROM), magnetic memory, magnetic disk, and optical disk.

According to an embodiment of the disclosure, the processor 220 may control an overall operation of the external device 200. For example, by executing one or more instructions stored in the memory 210, the processor 220 may perform the functions of the external device 200 illustrated in FIGS. 1 to 17.

The communication interface 230 may connect the external device 200 to the electronic device 100, the content providing server 300, and the target advertisement server 400 under the control of the processor 220.

In the example illustrated in FIG. 2, the external device 200 may include a display itself to directly display the data processed by the processor 220 on the display, or the external device 200 may transmit the data processed by the processor 220 to an electrically connected display device through the communication interface 230.

The external device 200 may include a set-top box, a digital video recorder (DVR), a receiver or similar customer premise equipment (CPE), a personal computer, a personal portable terminal, a smart phone, or the like.

The content providing server 300 may receive a content request from the electronic device 100 and transmit the content requested from the electronic device 100 to the electronic device 100 through an authentication process of the electronic device 100. In this case, the content providing server 300 may provide a list of target advertisements to be displayed during the play of the content together with the providing of the content. For example, when receiving a content request from the electronic device 100, the content providing server 300 may request the target advertisement server 400 for a target advertisement list including identification information of the content and information about the electronic device 100 and receive the target advertisement list from the target advertisement server 400. For example, before screen mirroring is performed, the content providing server 300 may receive only information about the electronic device 100 from the electronic device 100 and provide a target advertisement list targeting the user 1 of the electronic device 100 to the electronic device 100.

According to an embodiment of the disclosure, the content providing server 300 may receive a target advertisement list update request including information about the electronic device 100 including information about the user 1 and information about the external device 200 including information about the users 2, 3, and 4 from the electronic device 100 connected to the external device 200 by screen mirroring. According to an embodiment of the disclosure, the content providing server 300 may receive a target advertisement list update request including information about the external device 200 including information about the users 2, 3, and 4 from the electronic device 100 connected to the external device 200 by screen mirroring. Accordingly, the content providing server 300 may transmit the target advertisement list update request to the target advertisement server 400, receive an updated target advertisement list targeted based on the information about the electronic device 100 and the information about the external device 200 from the target advertisement server 400, and transmit the received updated target advertisement list to the electronic device 100.

According to an embodiment of the disclosure, the content providing server 300 may include a memory 310, a processor 320, and a communication interface 330.

According to an embodiment of the disclosure, the memory 310 may store one or more programs for processing and controlling the operations of the processor 320 and may store data that is input to the content providing server 300 or output from the content providing server 300.

The memory 310 may include at least one type of storage medium from among flash memory type, hard disk type, multimedia card micro type, card type memory (e.g., SD and XD memories), random-access memory (RAM), static random-access memory (SRAM), read-only memory (ROM), electronically erasable programmable read-only memory (EEPROM), programmable read-only memory (PROM), magnetic memory, magnetic disk, and optical disk.

According to an embodiment of the disclosure, the processor 320 may control an overall operation of the content providing server 300. For example, by executing one or more instructions stored in the memory 310, the processor 320 may perform the functions of the content providing server 300 illustrated in FIGS. 1 to 17.

The communication interface 330 may connect the content providing server 300 to the electronic device 100 and the target advertisement server 400 under the control of the processor 320.

The target advertisement server 400 may identify advertisements to be presented to the user based on the user's preference information and generate a target advertisement list including one or more identified advertisements and display commands. The target advertisement list may include pieces of advertisement content themselves or may include an identifier of target advertisement content. Because the user preference information is used to select the target advertisement, the advertisements identified in the target advertisement list may interest the user. The target advertisement list may be directly provided to a user terminal at the request of the user terminal or may be provided to a content providing server at the request of the content providing server.

According to an embodiment of the disclosure, the target advertisement server 400 may directly receive a target advertisement request including information about the electronic device 100 and information about the external device 200 connected by screen mirroring from the electronic device 100. The information about the electronic device 100 may include device information of the electronic device 100 and user information of the electronic device 100, and the information about the external device 200 may include device information of the external device 200 and user information of the external device 200. The target advertisement server 400 may determine a target advertisement targeted based on the information about the electronic device 100 and the information about the external device 200 and transmit target advertisement information to the electronic device 100. The target advertisement information may include the target advertisement content itself or may include information for accessing the target advertisement content.

According to an embodiment of the disclosure, the target advertisement server 400 may receive a target advertisement request including information about the external device 200 connected by screen mirroring from the electronic device 100. The information about the external device 200 may include device information of the external device 200 and user information of the external device 200. The target advertisement server 400 may determine a target advertisement targeted based on the information about the external device 200 and transmit target advertisement information to the electronic device 100.

According to an embodiment of the disclosure, the target advertisement server 400 may receive a target advertisement list request including information about the electronic device 100 and information about the external device 200 connected by screen mirroring from the content providing server 300. The information about the electronic device 100 may include device information of the electronic device 100 and user information of the electronic device 100, and the information about the external device 200 may include device information of the external device 200 and user information of the external device 200. The target advertisement server 400 may determine one or more target advertisements targeted based on the information about the electronic device 100 and the information about the external device 200 and transmit a target advertisement list including one or more target advertisements to the content providing server 300.

According to an embodiment of the disclosure, the target advertisement server 400 may include a memory 410, a processor 420, and a communication interface 430.

According to an embodiment of the disclosure, the memory 410 may store one or more programs for processing and controlling the operations of the processor 420 and may store data that is input to the target advertisement server 400 or output from the target advertisement server 400.

The memory 410 may include at least one type of storage medium from among flash memory type, hard disk type, multimedia card micro type, card type memory (e.g., SD and XD memories), random-access memory (RAM), static random-access memory (SRAM), read-only memory (ROM), electronically erasable programmable read-only memory (EEPROM), programmable read-only memory (PROM), magnetic memory, magnetic disk, and optical disk.

According to an embodiment of the disclosure, the processor 420 may control an overall operation of the target advertisement server 400. For example, by executing one or more instructions stored in the memory 410, the processor 420 may perform the functions of the target advertisement server 400 illustrated in FIGS. 1 to 17.

The communication interface 430 may connect the target advertisement server 400 to the electronic device 100 and the content providing server 300 under the control of the processor 420.

Figure 3:
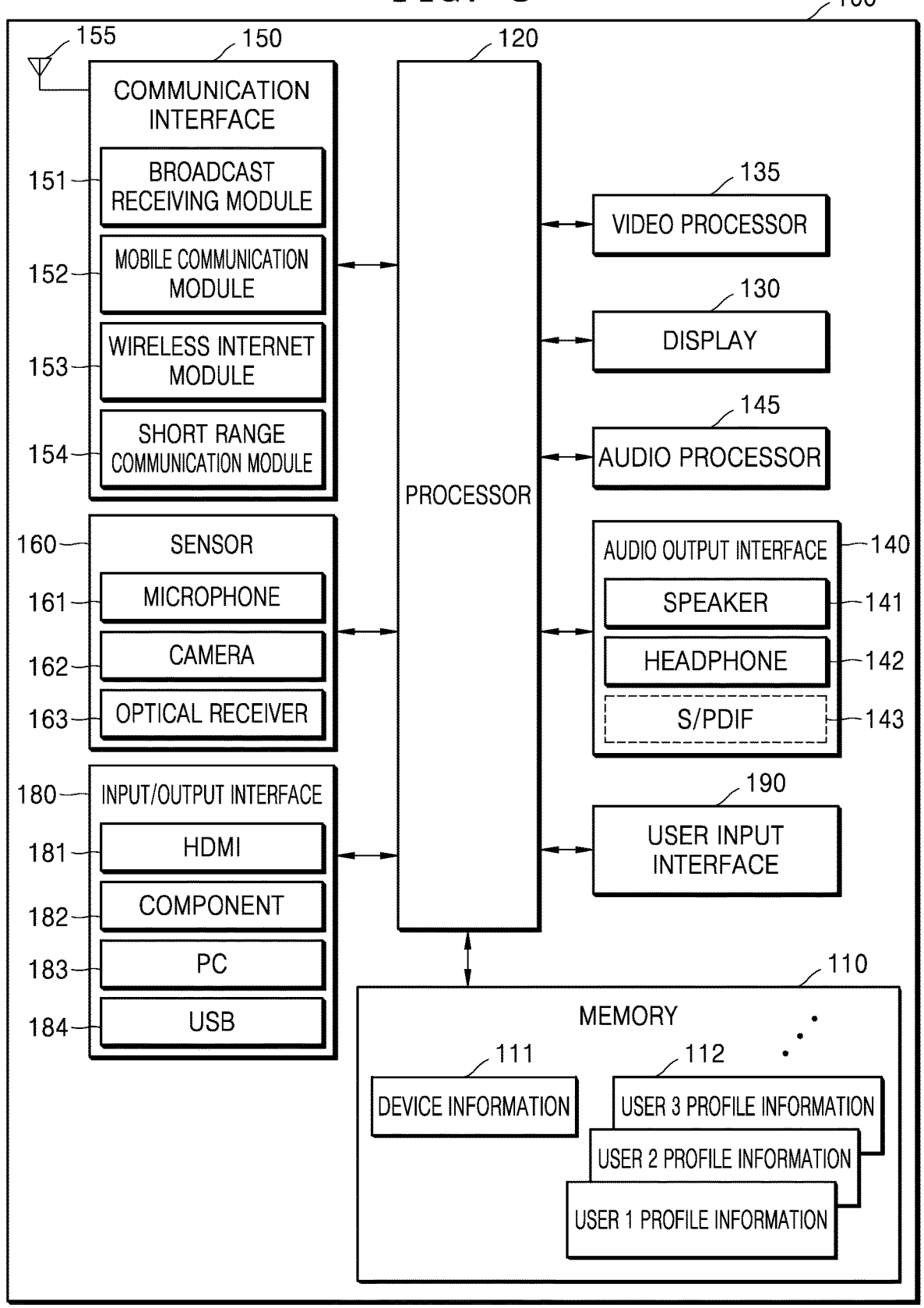
FIG. 3 is a detailed block diagram of an electronic device according to an embodiment of the disclosure.

FIG. 3 is a detailed block diagram of the electronic device 100 according to an embodiment of the disclosure.

In FIG. 3, the same components as those in the electronic device 100 of FIG. 2 are illustrated by using the same reference numerals. Thus, in describing the electronic device 100, redundant descriptions overlapping with those in FIG. 2 will be omitted for conciseness.

Referring to FIG. 3, in addition to the memory 110 and the processor 120, the electronic device 100 may further include a display 130, an antenna 155, a sensor 160, an input/output interface 180, a video processor 135, an audio processor 145, an audio output interface 140, and a user input interface 190.

As for the memory 110 and the processor 120, the same descriptions as those in FIG. 2 will be omitted in FIG. 3.

The display 130 may display an image on the screen under the control of the processor 120. The image displayed on the screen may be received from the communication interface 150, the input/output interface 180, and the memory 110. Screen data displayed on the display 130 may be displayed on the display of the external device 200 by screen mirroring.

The antenna 155 may receive signals transmitted by other devices or transmit signals to the other devices. Although one antenna 155 is illustrated, a plurality of antennas may be included therein.

The communication interface 150 may include one or more modules for enabling wireless communication between the electronic device 100 and a wireless communication system or between the electronic device 100 and a network in which other electronic devices are located. For example, the communication interface 150 may include a broadcast receiving module 151, a mobile communication module 152, a wireless Internet module 153, and a short-range communication module 154. The communication interface 150 may be referred to as a transmitter/receiver.

The broadcast receiving module 151 may receive broadcast signals and/or broadcast-related information from an external broadcast management server on broadcast channels. The broadcast signals may include not only a TV broadcast signal, a radio broadcast signal, and a data broadcast signal but also a broadcast signal in which a data broadcast signal is combined with a TV broadcast signal or a radio broadcast signal.

The mobile communication module 152 may transmit/receive wireless signals to/from at least one of a base station, an external terminal, or a server on a mobile communication network. The wireless signals may include voice call signals, video call signals, or various types of data according to transmission/reception of text/multimedia messages.

The wireless Internet module 153 may refer to a module for wireless Internet access and may be installed inside or outside a device. Wireless LAN (WLAN) (WiFi), Wireless broadband (Wibro), World Interoperability for Microwave Access (Wimax), High Speed Downlink Packet Access (HSDPA), or the like may be used as wireless Internet technology. Through the wireless Internet module 153, the device may establish a WiFi peer-to-peer (P2P) connection with another device. A streaming service between devices may be provided through such a Wi-Fi P2P connection, and a printing service may be provided by connecting with a printer or transmitting/receiving data.

The short-range communication module 154 may refer to a module for short-range communication. Bluetooth, Radio Frequency Identification (RFID), Infrared Data association (IrDA), Ultra Wideband (UWB), ZigBee, or the like may be used as short-range communication technology.

According to an embodiment of the disclosure, the communication interface 150 may connect to the external device 200 or transmit/receive video/audio data by using the wireless Internet module 153 or the short-range communication module 154.

According to an embodiment of the disclosure, the communication interface 150 may receive information about the external device 200 from the external device 200 connected by screen mirroring.

According to an embodiment of the disclosure, the communication interface 150 may transmit an advertisement request including information about the electronic device 100 and information about the external device 200 connected by screen mirroring to the content providing server 300 or the target advertisement server 400 and receive a target advertisement targeted based on the information about the electronic device 100 and the information about the external device 200 from the content providing server 300 or the target advertisement server 400.

The sensor 160 may sense the user's voice, the user's image, or the user's interaction and may include a microphone 161, a camera 162, and an optical receiver 163.

The microphone 161 may receive the user's utterance voice. The microphone 161 may convert the received voice into an electrical signal and output the electrical signal to the processor 120.

The camera 162 may receive an image (e.g., consecutive frames) corresponding to the user's motion including a gesture within a camera recognition range.

The optical receiver 163 may receive an optical signal including a control signal received from a remote controller. The optical receiver 163 may receive an optical signal corresponding to a user input (e.g., touch, press, touch gesture, voice, or motion) from the remote controller. The control signal may be extracted from the received optical signal under the control of the processor 120.

The input/output interface 180 may receive, for example, a video (e.g., moving image), an audio (e.g., voice and music), and additional information (e.g., EPG) from outside the electronic device 100 under the control of the processor 120. The input/output interface 180 may include any one of a High-Definition Multimedia Interface (HDMI) port 181, a component jack 182, a personal computer (PC) port 183, and a Universal Serial Bus (USB) port 184. The input/output interface 180 may include any combination of the HDMI port 181, the component jack 182, the PC port 183, and the USB port 184.

According to an embodiment of the disclosure, the memory 110 may store one or more programs for processing and controlling the operations of the processor 120 and may store data that is input to the electronic device 100 or output from the electronic device 100. Also, the memory 110 may store data necessary for the operation of the electronic device 100.

The programs stored in the memory 110 may be classified into a plurality of modules according to the functions thereof.

According to an embodiment of the disclosure, the memory 110 may include device information 111 and a user profile information database 112.

The device information 111 may include device information of the electronic device 100 and may include, for example, a country, a language, a device ID, a device IP address, or the like.

The user profile information database 112 may store user profile information about one or more users using the electronic device 100. For example, when the electronic device 100 is a television, the television may include user profile information of family members, for example, a mother, a father, and sons.

The user profile information may include, for example, information such as demographic characteristics such as the user's race, economic status, gender, age, education level, income level, or employment status, psychographic characteristics such as the user's value, personality, attitude, opinion, lifestyle, or interest, or characteristics such as the user's browser history, purchase history, or action variables including recent actions according to the user's use.

For example, electronic devices shared and used by one or more users, such as set-top boxes, DVRs, and televisions, may include one or more user profile information. For example, a television may include user profile information of each of the members in the family. As user information for requesting a target advertisement, the users may provide an input for selecting a profile in a certain format or identifying themselves by using a suitable interface or remote control. When a particular profile or a particular user is not selected, the electronic device 100 may select a designated profile or a default profile and use the same as user information for a target advertisement request.

The processor 120 may control an overall operation of the electronic device 100 and a signal flow between the internal components of the electronic device 100 and perform a data processing function. When there is a user's input or a preset stored condition is satisfied, the processor 120 may execute various applications and an operation system (OS) stored in the memory 110.

Also, the processor 120 may include an internal memory. In this case, at least one of the data, programs, or instructions stored in the memory 110 may be stored in the internal memory of the processor 120.

The processor 120 may include a plurality of processors. In this case, the one or more processors may include a general-purpose processor such as a central processing unit (CPU), an application processor (AP), or a digital signal processor (DSP), a graphic dedicated processor such as a graphic processing unit (GPU) or a vision processing unit (VPU), or an artificial intelligence dedicated processor such as a neural processing unit (NPU).

The video processor 135 may process image data to be displayed by the display 130 and perform various image processing operations such as decoding, rendering, scaling, noise filtering, frame rate conversion, and resolution conversion on the image data.

The audio processor 145 may perform processing on audio data. The audio processor 145 may perform various processing operations such as decoding, amplification, and noise filtering on the audio data.

Under control of the processor 120, the audio output interface 140 may output the audio included in the broadcast signal received through the antenna 155, the audio input through the communication interface 150 or the input/output interface 180, or the audio stored in the memory 110. The audio output interface 140 may include at least one of a speaker 141, a headphone output terminal 142, or a Sony/Philips Digital Interface (S/PDIF) output terminal 143.

The user input interface 190 may refer to a unit through which the user inputs data for controlling the electronic device 100. For example, the user input interface 190 may include a key pad, a dome switch, a touch pad, a jog wheel, and/or a jog switch but is not limited thereto.

Moreover, the block diagram of the electronic device 100 illustrated in FIG. 2 or 3 may be a block diagram for an embodiment. Each component of the block diagram may be integrated, added, or omitted according to the specifications of the electronic device 100 that are actually implemented. That is, when necessary, two or more components may be combined into one component, or one component may be divided into two or more components. Also, a function performed in each block is to describe embodiments, and a particular operation or device thereof is not intended to limit the scope of the disclosure.

Figure 4:
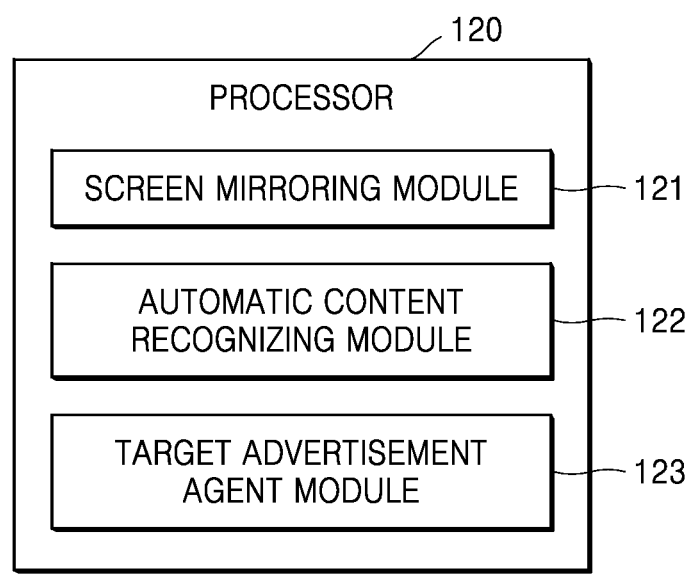
FIG. 4 illustrates an example of details of a processor of an electronic device according to an embodiment of the disclosure.

FIG. 4 illustrates an example of details of a processor of an electronic device according to an embodiment of the disclosure.

Referring to FIG. 4, the processor 120 may include a screen mirroring module 121, an automatic content recognizing module 122, and a target advertisement agent module 123.

The screen mirroring module 121 may include a suitable logic, circuit, interface, and/or code that may be operated to connect a communication and output screen data such that the screen data displayed on the display of the electronic device 100 may be displayed on the display of the external device.

According to an embodiment of the disclosure, the screen mirroring module 121 may establish a connection for screen mirroring by transmitting/receiving one or more signals to/from the external device in order to establish a connection for screen mirroring with the external device according to a screen mirroring request.

According to an embodiment of the disclosure, the screen mirroring module 121 may request information about the external device to the external device connected by screen mirroring, receive the information about the external device from the external device, and transmit the received information to the target advertisement agent module 123. The information about the external device may include information about a device of the external device and information about one or more users of the external device. The information about one or more users of the external device may include profile information of one or more users stored or registered in the external device.

According to an embodiment of the disclosure, when there is a screen mirroring release request, the screen mirroring module 121 may release a connection for screen mirroring with the external device.

The automatic content recognizing module 122 may include a suitable logic, circuit, interface, and/or code that may be operated to recognize the content displayed on the display when the content is displayed on the display of the electronic device 100. Two main technologies of automatic content recognition technology may be digital watermarking and digital fingerprinting. Digital watermarking may be a method in which a signal is transmitted after performing preprocessing for embedding watermark data in content and a receiver identifies the content by detecting the embedded watermark. Content fingerprinting may use audio or video content fingerprinting to identify content displayed on a display by extracting a fingerprint from content and matching the same with a database.

According to an embodiment of the disclosure, the automatic content recognizing module 122 may recognize content displayed on the display and provide content identification information resulting from the recognition to the target advertisement agent module 123 such that the content identification information may be used to request a target advertisement.

The target advertisement agent module 123 may include a suitable logic, circuit, interface, and/or code that may be operated to request a target advertisement during the display of the content, receive the requested target advertisement, and display target advertisement content according to the received target advertisement.

According to an embodiment of the disclosure, the target advertisement agent module 123 may transmit a target advertisement request including information about the external device connected by screen mirroring or a target advertisement request including information about the electronic device and information about the external device connected by screen mirroring to the target advertisement server at a target advertisement display point during the play of the content, receive the requested target advertisement information, and display target advertisement content by using the received target advertisement information. The received target advertisement information may include information for obtaining a target advertisement targeted based on the information about the electronic device and the information about the external device connected by screen mirroring. The received target advertisement information may include information for obtaining a target advertisement targeted based on the information about the external device connected by screen mirroring (active mode).

According to an embodiment of the disclosure, the target advertisement agent module 123 may provide information about the external device connected by screen mirroring or information about the electronic device and information about the external device connected by screen mirroring when a content request is made to the content providing server, receive content and a target advertisement list from the content providing server, and display the target advertisement content by using the received target advertisement list. According to an embodiment of the disclosure, the target advertisement list may include one or more target advertisements targeted based on the information about the electronic device and the information about the external device connected by screen mirroring. According to an embodiment of the disclosure, the target advertisement list may include one or more target advertisements targeted based on the information about the external device connected by screen mirroring (passive mode).

According to an embodiment of the disclosure, the target advertisement agent module 123 may provide information about the electronic device when a content request is made to the content providing server, receive content and a target advertisement list from the content providing server, and display target advertisement content by using the received target advertisement list. When connected to the external device by screen mirroring after the display of the content, the target advertisement agent module 123 may transmit a target advertisement list update request including information about the external device or a target advertisement list update request including information about the electronic device and information about the external device to the content providing server and receive an updated target advertisement list from the content providing server. The updated target advertisement list may include one or more advertisements targeted based on the information about the external device or one or more target advertisements targeted based on information about the electronic device and the information about the external device (passive mode).

Figure 5:
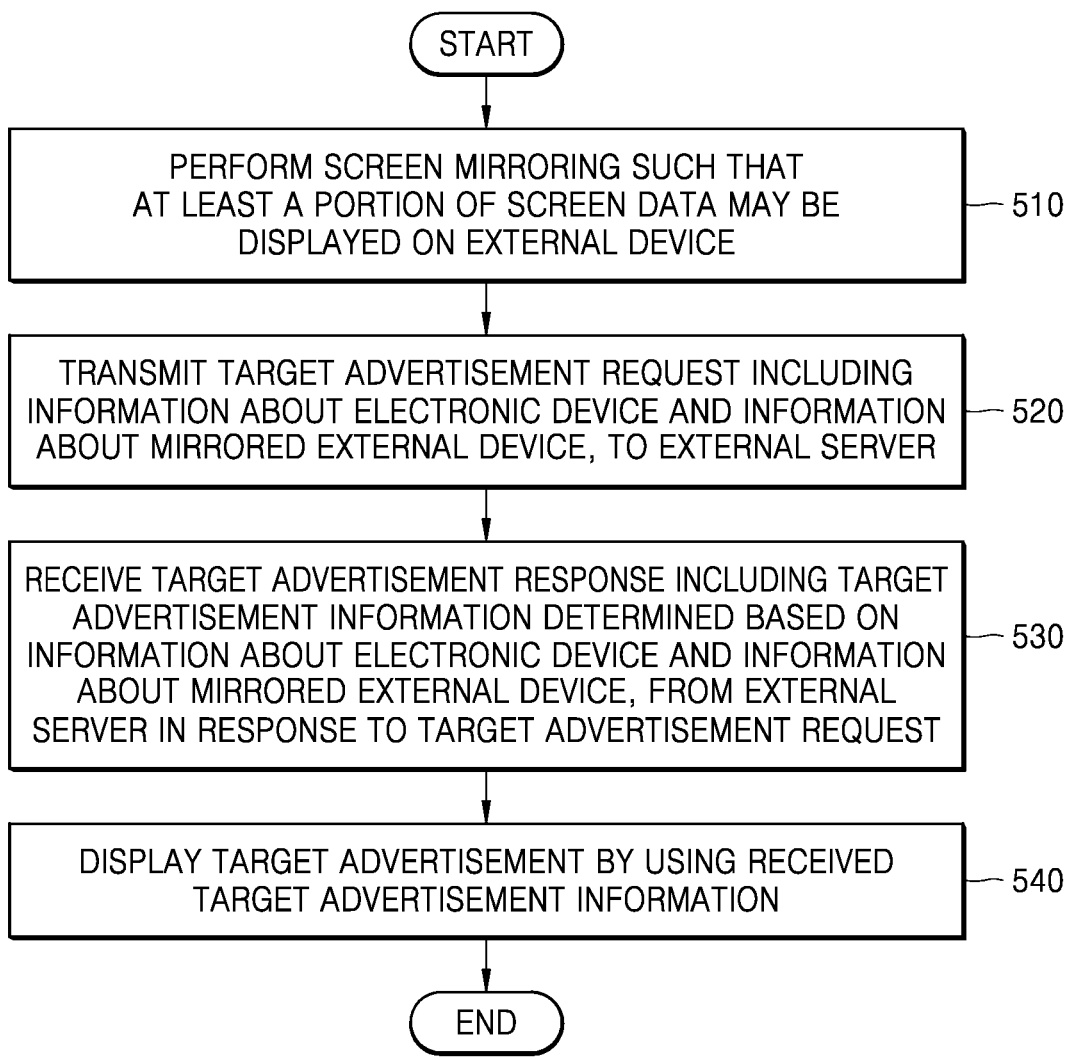
FIG. 5 is a flowchart illustrating operations in an electronic device according to an embodiment of the disclosure.

FIG. 5 is a flowchart illustrating operations in the electronic device 100 according to an embodiment of the disclosure.

Referring to FIG. 5, in operation 510, the electronic device 100 may perform screen mirroring such that at least a portion of the screen data displayed on the display may be displayed on the external device 200.

When receiving a screen mirroring request from the user, the electronic device 100 may establish a connection for screen mirroring with the external device 200 to perform screen mirroring. The screen mirroring connection establishment may be accomplished by the electronic device 100 transmitting a connection request for screen mirroring to the external device 200 and receiving a response to the connection request from the external device 200.

When a connection for screen mirroring is established, the electronic device 100 may transmit screen data displayed on the display of the electronic device 100 to the external device 200. The external device to which the connection for screen mirroring has been established may display the screen data received from the electronic device 100 on the display of the external device 200.

The electronic device 100 may transmit some or all of the screen data displayed on the display of the electronic device 100 to the external device 200 for screen mirroring. For example, when the display of the electronic device 100 is used as a single screen to display one piece of content, the electronic device 100 may transmit the content displayed on the single screen to the external device 200. For example, when the display of the electronic device 100 is used as a multi screen, the electronic device 100 may transmit the data displayed on one screen of the multi screen to the external device 200. For example, when the display of the electronic device 100 includes a picture in picture (PIP) in the main content, the electronic device 100 may transmit at least one of the main content or the PIP content to the external device 200.

In operation 520, the electronic device 100 may transmit a target advertisement request including information about the electronic device 100 and information about the mirrored external device 200 to the external server.

The target advertisement request may be transmitted at any time during the play of the content, for example, before the start of the content (pre-roll), during the play of the content (mid-roll), or after the end of the content (post-roll), and an advertisement request may be transmitted by using HTTP. The advertisement request may be transmitted to the external server, and the external server to which the target advertisement request is transmitted may be an advertisement server of a content provider or a supply side platform (SSP).

When a connection for screen mirroring is established between the electronic device 100 and the external device 200, the electronic device 100 may request the external device 200 for information about the external device 200. In response to the request, the external device 200 may transmit information about the external device 200 to the electronic device 100. The information about the external device 200 may include device information of the external device 200 and information about the user of the external device 200.

When receiving the information about the external device 200 from the external device 200, the electronic device 100 may generate a target advertisement request message based on the information about the electronic device 100 and the information about the external device 200. According to an example, the advertisement request message may use a Video Ad Serving Template (VAST) that is a message according to the standards for communication requirements between an advertisement server and a video player.

According to another example, the electronic device 100 may generate a target advertisement request message including the information about the external device 200 without the information about the electronic device 100.

The target advertisement request message may further include mirroring connection state information indicating that the electronic device 100 is performing mirroring to the external device 200.

Figure 6:
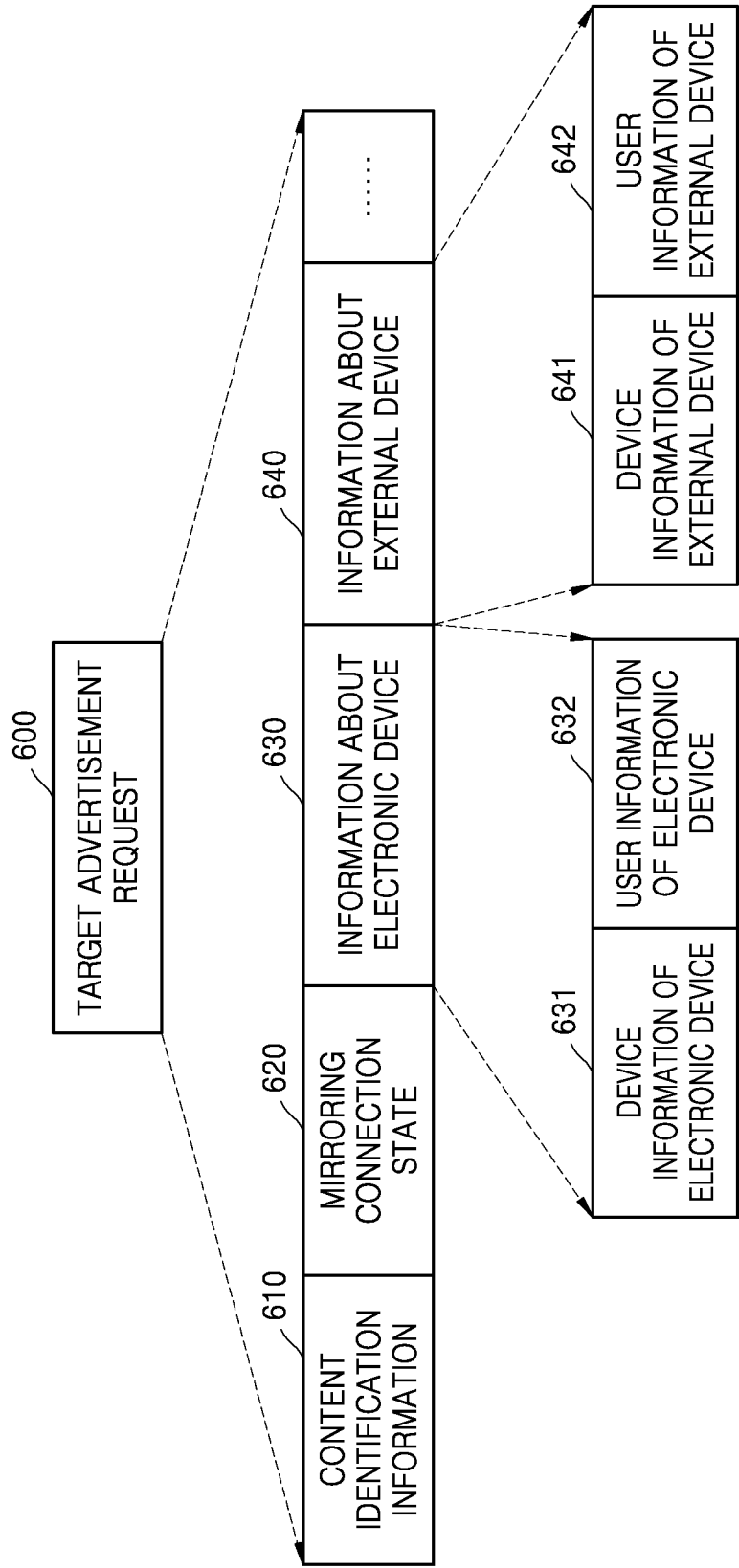
FIG. 6 illustrates an example of a target advertisement request message according to an embodiment of the disclosure.

FIG. 6 illustrates an example of a target advertisement request message according to an embodiment of the disclosure.

Referring to FIG. 6, a target advertisement request message 600 may include content identification information 610, a mirroring connection state 620, information 630 about the electronic device, and information 640 about the external device.

The content identification information 610 may include information for identifying content currently displayed on the display by the electronic device 100. The information for identifying the content may include, for example, not only a content identifier but also a digital watermark, a digital fingerprint, or the like used to identify the content. Automatic content recognition may be used as technology for recognizing content displayed on a display. When the electronic device 100 displays one or more pieces of content on the display by using a multi screen or the like and one of the one or more pieces of content is mirrored to the external device, the content identification information 610 may be information for identifying the content mirrored to the external device 200.

The mirroring connection state 620 may include information indicating that the electronic device 100 is in a screen mirroring connection state with the external device 200.

The information 630 about the electronic device may include device information 631 of the electronic device mainly indicating information set in the electronic device itself and user information 632 of the electronic device indicating the inclination of the user using the electronic device. In general, when these two pieces of information, that is, the device information of the electronic device and the user information of the electronic device, are combined, because the inclination, taste, and interest information of the user of the electronic device may be suitably extracted, this information may be used to extract a target advertisement suitable for the user.

The device information 631 of the electronic device may include, for example, country information, region information, language information, device ID, device IP, or the like set in the electronic device, and such information may be set by the electronic device itself or may be set by the user.

The user information 632 of the electronic device may include the viewing history, preference settings, account information, or the like and may include, for example, demographic characteristic information such as the user's race, economic status, gender, age, education level, income level, or employment status, psychographic characteristic information such as the user's value, personality, attitude, opinion, lifestyle, or interest, or characteristic information such as the user's browser history (e.g., channel or program information the user has viewed, the frequency at which the user has viewed a particular channel or program, or the length of time while the user has viewed a particular channel or program), purchase history, or action variables including recent actions (e.g., how long the user views content per day or per week, how often the user changes channels during a particular time period, or how often the user tries a new channel during a designated time period) according to the use of the electronic device by the user.

The information 640 about the external device may include device information 641 of the external device mainly indicating information set in the external device itself and user information 642 of the external device indicating the inclination of the user using the external device. In general, when these two pieces of information, that is, the device information of the external device and the user information of the external device, are combined, because the inclination, taste, and interest information of the user of the external device may be suitably extracted, this information may be used to extract a target advertisement suitable for the user.

The device information 641 of the external device may include, for example, country information, region information, language information, device ID, device IP, or the like set in the external device, and such information may be set by the external device itself or may be set by the user of the external device.

The user information 642 of the external device may include the viewing history, preference settings, account information, or the like and may include, for example, demographic characteristic information such as the external device user's race, economic status, gender, age, education level, income level, or employment status, psychographic characteristic information such as the external device user's value, personality, attitude, opinion, lifestyle, or interest, or characteristic information such as the external device user's browser history, purchase history, or action variables including recent actions according to the use of the electronic device by the user of the external device.

The target advertisement request message 600 illustrated in FIG. 6 may include one piece of user information as user information 632 of the electronic device and one piece of external device user information as user information 642 of the external device but is not limited thereto. When there are two or more users using the electronic device, the user information 632 of the electronic device may include information about each of the two or more users. Likewise, when there are two or more users using the external device, the user information 642 of the external device may include information about each of the two or more users.

Referring back to FIG. 5, the electronic device 100 may transmit the generated target advertisement request message to the external server.

According to an embodiment of the disclosure, the electronic device 100 may transmit a target advertisement request message to the content providing server 300 that is currently providing content. The content providing server 300 that has received the target advertisement request message may transmit a target advertisement request to the target advertisement server 400, and the target advertisement server 400 may determine a target advertisement targeted based on the information about the electronic device and the information about the external device included in the target advertisement request message and transmit the determined target advertisement to the content providing server 300. An advertisement mode in which the content providing server 300 inserts an advertisement in content and transmits the advertisement together with the content when providing the content to the electronic device may be referred to as a passive mode. Generally, in the passive mode, when the content providing server 300 first provides content to the user, because an advertisement to be included in the content is determined in advance, the electronic device 100 receiving the content rarely transmits a target advertisement request message to the content providing server 300; however, for example, when the electronic device 100 performs screen mirroring with the external device 200 during the display of the content, because the range of users consuming the content has changed, the electronic device 100 may request the update of a target advertisement by transmitting a target advertisement request message considering the changed situation to the content providing server 300.

According to another embodiment of the disclosure, the electronic device 100 may transmit a target advertisement request message to the target advertisement server 400 providing a target advertisement. The target advertisement server 400 may determine a target advertisement targeted based on the information about the electronic device and the information about the external device included in the target advertisement request message. An advertisement mode in which the content providing server 300 provides only the content to the electronic device 100 when providing content to the electronic device 100 and the electronic device 100 directly requests and receives a target advertisement from the target advertisement server 400 at least once during the play of the content and displays the target advertisement may be referred to as an active mode. In the active mode, the electronic device 100 may transmit a target advertisement request message to the target advertisement server 400 whenever an advertisement is displayed in real time.

In operation 530, in response to the target advertisement request, the electronic device 100 may receive, from the external server, a target advertisement response including target advertisement information determined based on information about the electronic device and information about the screen-mirrored external device.

According to an embodiment of the disclosure, when the electronic device 100 transmits both information about the electronic device and information about the external device to the external server, the electronic device 100 may receive a target advertisement response including target advertisement information determined based on the information about the electronic device and the information about the external device from the external server.

According to another embodiment of the disclosure, when the electronic device 100 transmits information about the external device to the external server, the electronic device 100 may receive a target advertisement response including target advertisement information determined based on the information about the external device.

Figure 7:
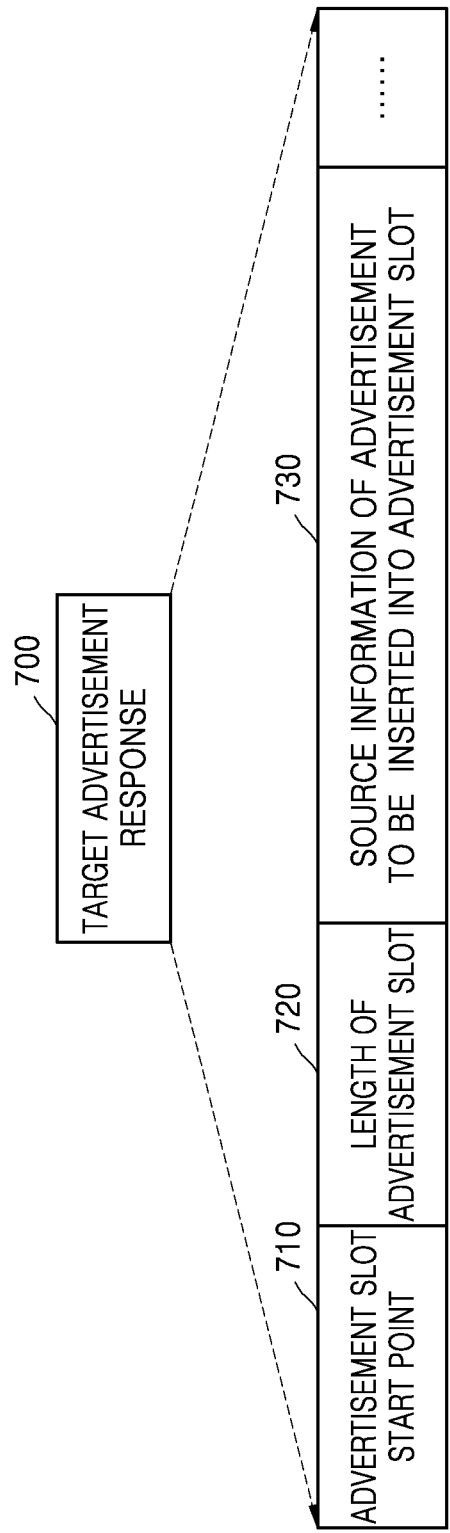
FIG. 7 illustrates an example of a target advertisement response according to an embodiment of the disclosure.

FIG. 7 illustrates an example of a target advertisement response according to an embodiment of the disclosure.

Referring to FIG. 7, a target advertisement response message 700 may include an advertisement slot start point 710 indicating a start time of an advertisement slot in which a target advertisement is displayed, a length 720 of an advertisement slot, or source information 730 of an advertisement to be inserted into an advertisement slot including access information for obtaining a target advertisement to be inserted into an advertisement slot.

In operation 540, the electronic device 100 may display a target advertisement by using the received target advertisement information. Because the electronic device 100 is in a screen mirroring connection state with the external device 200, target advertisement data displayed by the electronic device 100 may be transmitted to and displayed on the external device 200.

According to an embodiment of the disclosure, because the target advertisement information included in the target advertisement response received by the electronic device 100 may include the target advertisement itself, the electronic device 100 may directly display the target advertisement.

According to an embodiment of the disclosure, the target advertisement information included in the target advertisement response received by the electronic device 100 may include address information such as a URL for accessing the target advertisement, and the electronic device 100 may obtain the target advertisement by accessing a server providing the target advertisement by using the address information.

According to an embodiment of the disclosure, the target advertisement displayed by the electronic device 100 may include a link for accessing additional information or detailed information or payment information provided by the target advertisement, and upon receiving an input for selecting the link from the user, the electronic device 100 may access an address corresponding to the link to obtain additional information, detailed information, payment information, or the like provided by the target advertisement.

Hereinafter, an operation according to each scenario of a target advertisement providing method will be described in detail.

Figure 8:
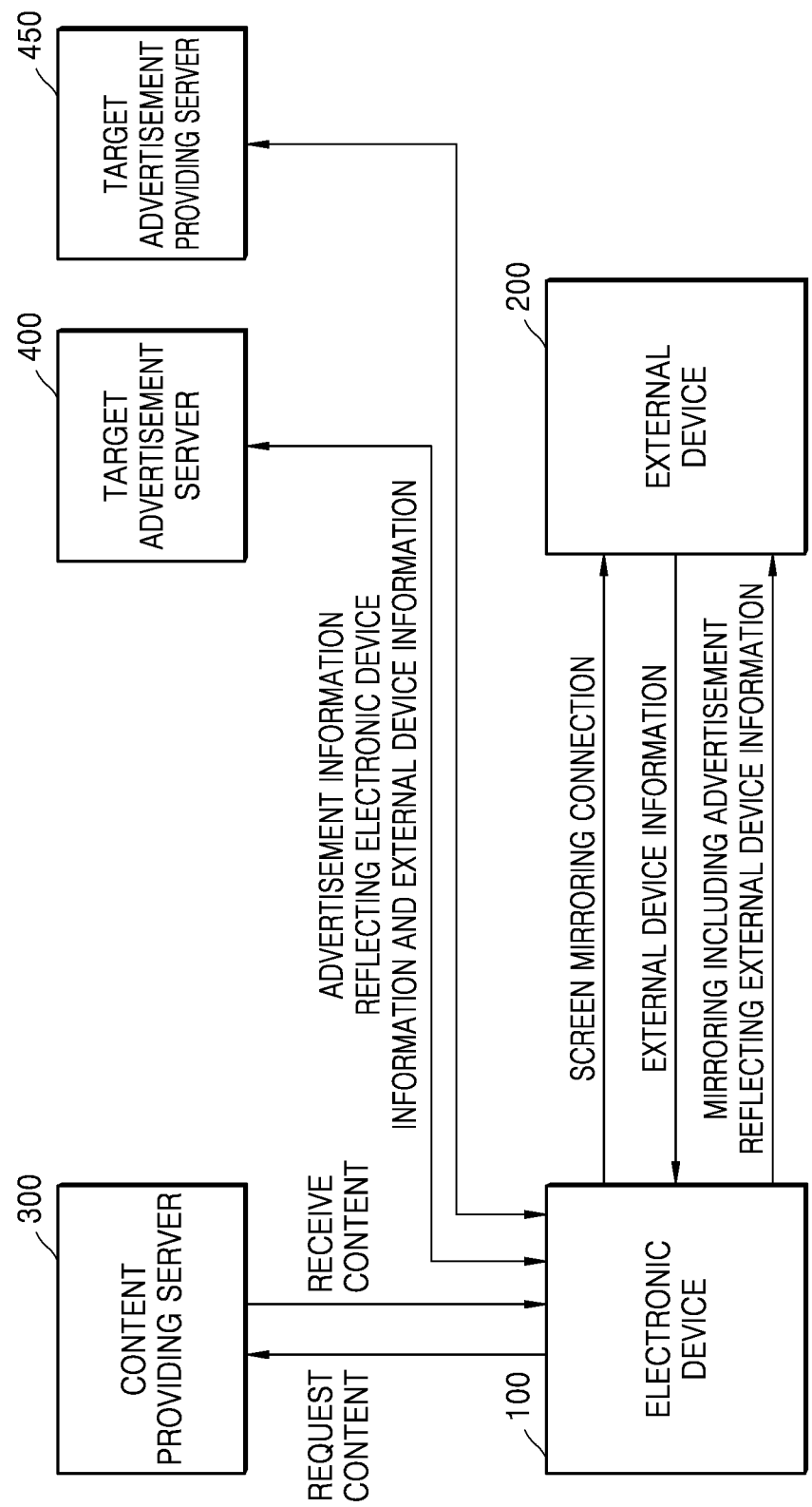
FIG. 8 illustrates a system for describing operations in an active mode in which an electronic device actively requests a target advertisement server for a target advertisement, according to an embodiment of the disclosure.

FIG. 8 illustrates a system for describing operations in an active mode in which an electronic device actively requests a target advertisement server for a target advertisement, according to an embodiment of the disclosure.

FIG. 9A illustrates an example of a flowchart of operations in an active mode in which an electronic device actively requests a target advertisement server for a target advertisement, according to an embodiment of the disclosure.

FIG. 9B illustrates another example of a flowchart of operations in an active mode in which an electronic device actively requests a target advertisement server for a target advertisement, according to an embodiment of the disclosure.

Figure 10:
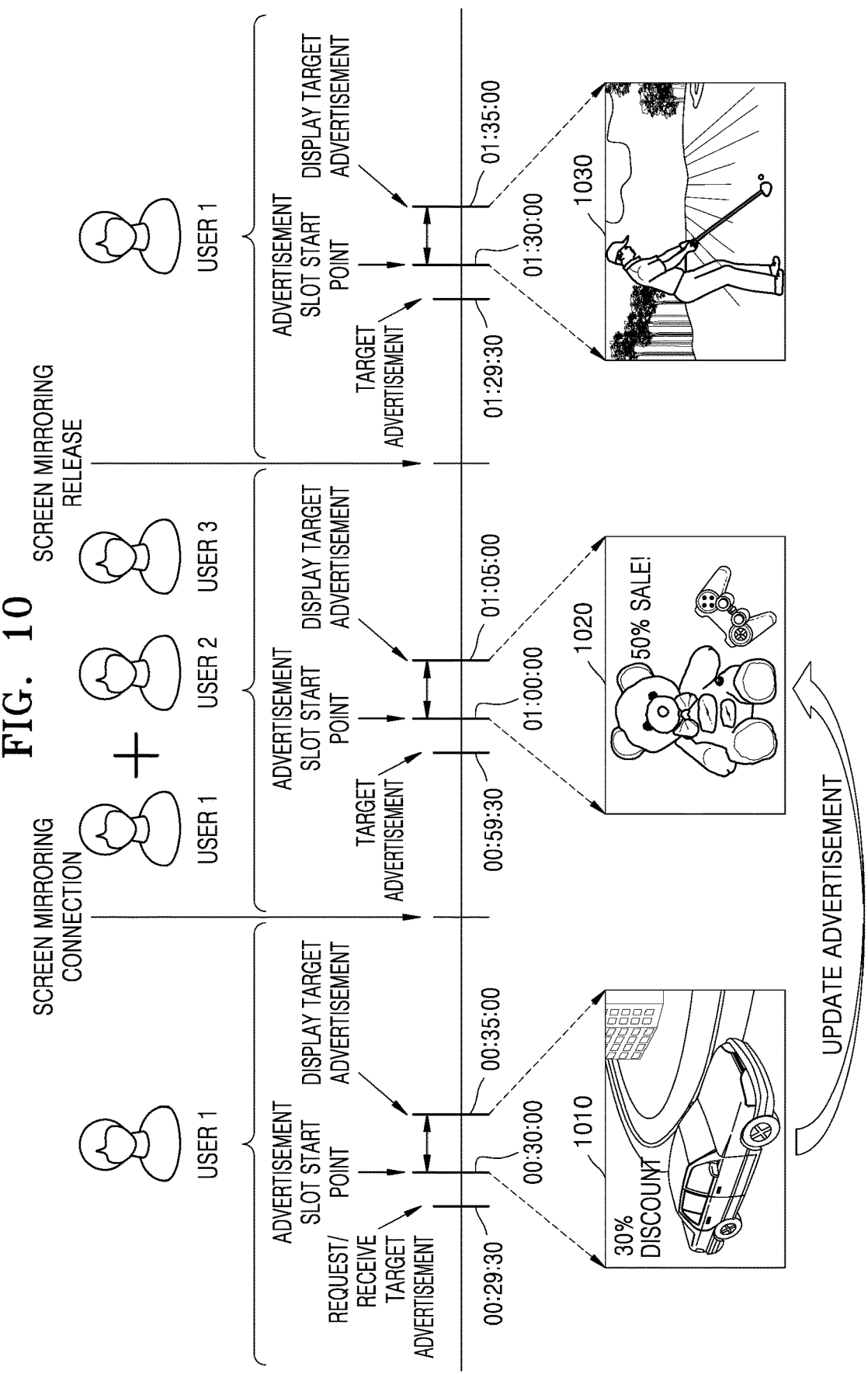
FIG. 10 illustrates a timing diagram for describing operations in an active mode in which an electronic device actively requests a target advertisement server for a target advertisement, according to an embodiment of the disclosure.

FIG. 10 illustrates a timing diagram for describing operations in an active mode in which an electronic device actively requests a target advertisement server for a target advertisement, according to an embodiment of the disclosure.

Hereinafter, a target advertisement providing method in an active mode in which an electronic device actively requests a target advertisement server for a target advertisement according to an embodiment of the disclosure will be described with reference to FIGS. 8, 9A, 9B, and 10. In the active mode, the electronic device may request and receive content from the content providing server, and management of a target advertisement performed during the display of the content may be performed by, for example, the target advertisement agent module of the electronic device. In the active mode, the target advertisement agent module may periodically request and receive a target advertisement from the target advertisement server according to a certain rule and display target advertisement content based on the received target advertisement.

Referring to FIGS. 8 and 9A, in operation 901, the electronic device 100 may request the content providing server 300 for content.

In operation 902, after authenticating the electronic device 100 through a certain authentication process, the content providing server 300 may provide the content requested by the electronic device 100 to the electronic device 100. The certain authentication process may be performed by using, for example, at least one of an ID set by the user, a password, an identifier of the electronic device 100, or a communication address of the electronic device 100, and the content providing server 300 may provide one or more pieces of such user authentication information to the target advertisement server 400 such that the electronic device 100 may later use the same to access the target advertisement server 400 for a target advertisement request.

In operation 903, the electronic device 100 may display the content received from the content providing server 300.

In the active mode in which the electronic device 100 actively requests the target advertisement server 400 for a target advertisement, the content providing server 300 may only provide the content requested by the electronic device 100 and the advertisement request and control operation thereof may be performed by the target advertisement agent module of the electronic device 100.

The target advertisement agent module may control requesting the target advertisement, receiving the target advertisement from an external server, and displaying the target advertisement according to a rule based on how the target advertisement should be displayed during the display of the content. For example, the target advertisement agent module may process the target advertisement according to information such as at what time periods the target advertisement is displayed during the display of the content, to which server the target advertisement should be requested, and/or when the target advertisement should be requested. For example, the target advertisement agent module may receive, from the content providing server 300, information necessary for processing of the target advertisement, such as at what time periods the target advertisement is displayed during the display of the content, to which server the target advertisement should be requested, and/or when the target advertisement should be requested. For example, the information necessary for processing of the target advertisement may be received together with the content.

In operation 904, the target advertisement agent module of the electronic device 100 may transmit a target advertisement request to the target advertisement server 400 based on the information necessary for processing of the target advertisement. Because the target advertisement request targets the user using the electronic device 100, that is, the user consuming the content displayed on the electronic device 100, the target advertisement request may include information for identifying the content and information about the electronic device 100, for example, device information of the electronic device 100 and information about the user of the electronic device 100. The device information of the electronic device 100 may include, for example, the country information, region information, language information, device ID, device IP, or the like set in the electronic device 100. The user information of the electronic device 100 may include the user's viewing history, preference settings, account information, or the like and may include, for example, demographic characteristic information such as the electronic device user's race, economic status, gender, age, education level, income level, or employment status, psychographic characteristic information such as the electronic device user's value, personality, attitude, opinion, lifestyle, or interest, or characteristic information such as the electronic device user's browser history, purchase history, or action variables including recent actions according to the use of the electronic device 100 by the user of the electronic device 100.

In operation 905, the target advertisement server 400 may receive information for identifying the content included in the target advertisement request and information about the electronic device, identify the content currently displayed on the electronic device 100 based on the information for identifying the content, determine a target advertisement targeted at the user of the electronic device based on the information about the electronic device, and transmit the determined target advertisement information to the electronic device 100. For example, as illustrated in FIG. 7, the target advertisement information may be provided by the target advertisement response 700 including the advertisement slot start time, the length of the advertisement slot, and the source information of the advertisement content to be inserted into the advertisement slot. However, the target advertisement information is not limited to this format. The target advertisement information may be in any form as long as the electronic device 100 may receive the same to identify, obtain, and display the target advertisement.

In operation 906, the electronic device 100 may request a target advertisement providing server 450 for the advertisement content by using the received target advertisement information, and in operation 907, the electronic device 100 may receive the requested advertisement content from the target advertisement providing server 450. For example, the target advertisement information may include target advertisement address information for accessing the target advertisement, and the electronic device 100 may use the target advertisement address information to access the target advertisement providing server 450 to request and receive target advertisement content.

In operation 908, the electronic device 100 may display the received target advertisement content at a suitable time. For example, the electronic device 100 may display the target advertisement content at an advertisement slot start point as illustrated in FIG. 7.

At some point while the electronic device 100 is playing the content, in operation 909, the electronic device 100 may receive a screen mirroring request from the user.

In operation 910, the electronic device 100 may establish a connection for screen mirroring with the external device 200 to which screen mirroring is requested.

In operation 911, the electronic device 100 may request the external device 200 for information about the external device, and in operation 912, the electronic device 100 may receive information about the external device from the external device 200. As described with reference to FIG. 6, the information about the external device may include device information about the external device and information about the user of the external device. The device information of the external device may include, for example, the country information, region information, language information, device ID, device IP, or the like set in the external device. The user information of the external device may include the external device user's viewing history, preference settings, account information, or the like and may include, for example, demographic characteristic information such as the external device user's race, economic status, gender, age, education level, income level, or employment status, psychographic characteristic information such as the external device user's value, personality, attitude, opinion, lifestyle, or interest, or characteristic information such as the external device user's browser history, purchase history, or action variables including recent actions according to the use of the external device by the user of the external device.

The request and transmission of the external device information may be performed in the mirroring connection establishment operation 910 or may be performed in a content mirroring operation 913. Alternatively, the request and transmission of the external device information may be performed before an advertisement request operation of operation 915.

In operation 913, the electronic device 100 may perform screen mirroring to transmit screen data including the content output from the electronic device 100 to the external device 200, and in operation 914, the external device 200 may display the received content.

Next, when the target advertisement is to be displayed, the electronic device 100 may request the target advertisement server 400 for a target advertisement. In this case, it may be the point when screen mirroring is being performed with the external device 200. Thus, in addition to the user consuming the content in the electronic device 100, the user consuming the same content in the external device 200 may be added by screen mirroring, and thus the overall range of users consuming the content may be expanded. As the range of users consuming the content is expanded, advertisement targeting may need to be performed in accordance with the expanded range of users.

Thus, for this purpose, in operation 915, the electronic device 10 may transmit a target advertisement request including not only information about the electronic device but also information about the external device connected by screen mirroring to the target advertisement server 400.

Unlike in operation 905 of determining the target advertisement based on only the information about the electronic device, in operation 916, the target advertisement server 400 may determine the target advertisement based on the received information about the electronic device and the information of the external device connected by screen mirroring and transmit a target advertisement response including the determined target advertisement information to the electronic device 100.

In operation 917, the electronic device 100 may request the target advertisement providing server 450 for the target advertisement content by using the target advertisement information included in the received target advertisement response, and in operation 918, the electronic device 100 may receive the requested target advertisement content from the target advertisement providing server 450.

In operation 919, the electronic device 100 may display the target advertisement content determined based on not only the information about the electronic device but also the information about the external device.

In operation 920, by screen mirroring, the external device 200 may also display the target advertisement content determined based on not only the information about the electronic device but also the information about the external device.

The operations in FIG. 9B may be mostly similar to the operations in FIG. 9A; however, there may be a difference in the operations after operation 914. In FIG. 9A, both the information about the electronic device and the information about the external device may be provided when the electronic device 100 requests the target advertisement server 400 for the target advertisement; however, in FIG. 9B, only the information about the external device may be provided when the electronic device 100 requests the target advertisement server 400 for the target advertisement. Because operations 901 to 914 in FIG. 9B are the same as those in FIG. 9A, redundant descriptions thereof will be omitted for conciseness.

In operation 921, as the range of users consuming the content is expanded, the electronic device 100 may transmit a target advertisement request including information about the external device connected by screen mirroring to the target advertisement server 400 such that advertisement targeting may be performed in accordance with the expanded range of users.

Unlike in operation 905 of determining the target advertisement based on the information about the electronic device, in operation 922, the target advertisement server 400 may determine the target advertisement based on the information about the external device connected by screen mirroring and transmit a target advertisement response including the determined target advertisement information to the electronic device 100.

In operation 923, the electronic device 100 may request the target advertisement providing server 450 for the target advertisement content by using the target advertisement information included in the received target advertisement response, and in operation 924, the electronic device 100 may receive the requested target advertisement content from the target advertisement providing server 450.

In operation 925, the electronic device 100 may display the target advertisement content determined based on the information about the external device connected by screen mirroring.

In operation 926, by screen mirroring, the external device 200 may also display the target advertisement content determined further based on the information about the external device.

When the screen data displayed on the electronic device 100 is transmitted to the external device 200 by screen mirroring, because there is a high probability that the users will want to mainly view the screen data through the external device 200, it may be efficient to provide an advertisement targeting the users of the external device 200 without consideration of the information about the electronic device 100 or the user of the electronic device 100. In FIG. 9B, a target advertisement targeting the users of the external device connected by screen mirroring may be provided in consideration of this situation.

A particular example of operations in an active mode in which an electronic device actively requests a target advertisement server for a target advertisement according to an embodiment of the disclosure will now be described with reference to FIG. 10.

Referring to FIG. 10, before screen mirroring, the electronic device, for example, a mobile device, may display content according to a request of the user 1. During the display of the content, a target advertisement agent module of the mobile device may request, receive, and display a target advertisement at certain intervals. For example, assuming that a target advertisement display period is about 30 minutes and it takes less than about 30 seconds to receive the target advertisement information, access the target advertisement content, decode the accessed target advertisement content, and display the decoding result on the display, for the first target advertisement, the electronic device 100 may request and receive the target advertisement about 30 seconds before 00:30:00. A target advertisement request message transmitted by the electronic device 100 to the target advertisement server may include information about the electronic device 100 and user information about the electronic device 100, and the target advertisement server may select an optimal target advertisement based on the information about the electronic device 100 and the user information about the electronic device 100 and transmit a target advertisement response message including target advertisement information to the electronic device 100. The electronic device 100 may obtain, decode, and prepare target advertisement content to be displayed in an advertisement slot by using the target advertisement information and then start displaying the same at a next advertisement slot start point and display the target advertisement content for, for example, about 5 minutes. For example, when the user 1 using the mobile device is a mid-forties man and has an income level of about the middle class, a sedan-type car advertisement image 1010 may be displayed as an example of the target advertisement content. However, this is merely an example for description, and the target advertisement server may determine a target advertisement optimal for the user 1 based on the user 1's demographic characteristic information, psychographic characteristic information, or characteristic information such as action variables by using more complex and various algorithms or artificial intelligence.

The electronic device 100 may perform screen mirroring at a next target advertisement display point, that is, at any point before 01:00:00 corresponding to about 30 minutes later such that the screen data displayed on the electronic device may be transmitted to and displayed on the external device, for example, a television. In this case, the users registered in the television may be the user 2 and the user 3, and thus, by screen mirroring, the content initially displayed on the electronic device 100 may be viewed by the user 2 and the user 3 as well as the user 1. The electronic device 100 may receive and store device information of the television and information about the user 2 and the user 3 that are the television users by requesting the television that is the screen-mirrored external device.

For the second target advertisement, the electronic device 100 may request and receive the target advertisement about 30 seconds before 01:00:00. At this point, because the electronic device 100 is performing screen mirroring with the external device and thus the number of users viewing the content is expanded from the user 1 to the user 2 and the user 3, the electronic device 100 may include information about the expanded users in the target advertisement request message in order to obtain the target advertisement suitable for the expanded users. That is, the target advertisement request message transmitted by the electronic device 100 to the target advertisement server may include not only information about the electronic device 100 and user information of the electronic device 100 but also device information of the external device and information about the user 2 and the user 3 that are the users of the external device, and the target advertisement server may select an optimal target advertisement based on not only the information about the electronic device 100 and the user information of the electronic device 100 but also the device information of the external device and the information about the user 2 and the user 3 that are the users of the external device and transmit a target advertisement response message including target advertisement information to the electronic device 100. The electronic device 100 may obtain, decode, and prepare target advertisement content to be displayed in an advertisement slot by using the target advertisement information and then start displaying the same at a next advertisement slot start point and display the target advertisement content for, for example, about 5 minutes. For example, when the user 2 and the user 3 using the television as the external device are children, a toy advertisement image 1020 may be displayed as an example of the target advertisement content. However, this is merely an example for description, and the target advertisement server may determine a target advertisement optimal for the users 1, 2, and 3 based on the users 1, 2, and 3's demographic characteristic information, psychographic characteristic information, or characteristic information such as action variables by using more complex and various algorithms or artificial intelligence.

The electronic device 100 may release the screen mirroring with the external device at a next target advertisement display point, that is, at any point before 01:30:00 corresponding to about 30 minutes later such that the screen data displayed on the electronic device may no more be displayed on the external device. Thus, the user consuming the content may now be changed to only the user 1. Thus, when only the user 1 is viewing the content, an advertisement targeting only the user 1 may be provided without the need to consider the users 2 and 3.

For the third target advertisement, the electronic device 100 may request and receive the target advertisement about 30 seconds before 01:30:00. At this point, a target advertisement request message transmitted by the electronic device 100 to the target advertisement server may include information about the electronic device 100 and user information about the electronic device 100, and the target advertisement server may select an optimal target advertisement based on the information about the electronic device 100 and the user information about the electronic device 100 and transmit a target advertisement response message including target advertisement information to the electronic device 100. The electronic device 100 may obtain, decode, and prepare target advertisement content to be displayed in an advertisement slot by using the target advertisement information and then start displaying the same at a next advertisement slot start point and display the target advertisement content for, for example, about 5 minutes. For example, the third target advertisement content displayed on the mobile device may be an advertisement targeting the user 1 that is a mid-forties man and has an income level of about the middle class, and a sportswear advertisement image 1030 may be displayed as an example thereof.

As such, in embodiments of the disclosure, even when the user range is changed or expanded by screen mirroring, the optimal target advertisement may be adaptively provided in accordance with the changed or expanded users by flexibly providing information about the changed or expanded users to the target advertisement server.

Figure 11:
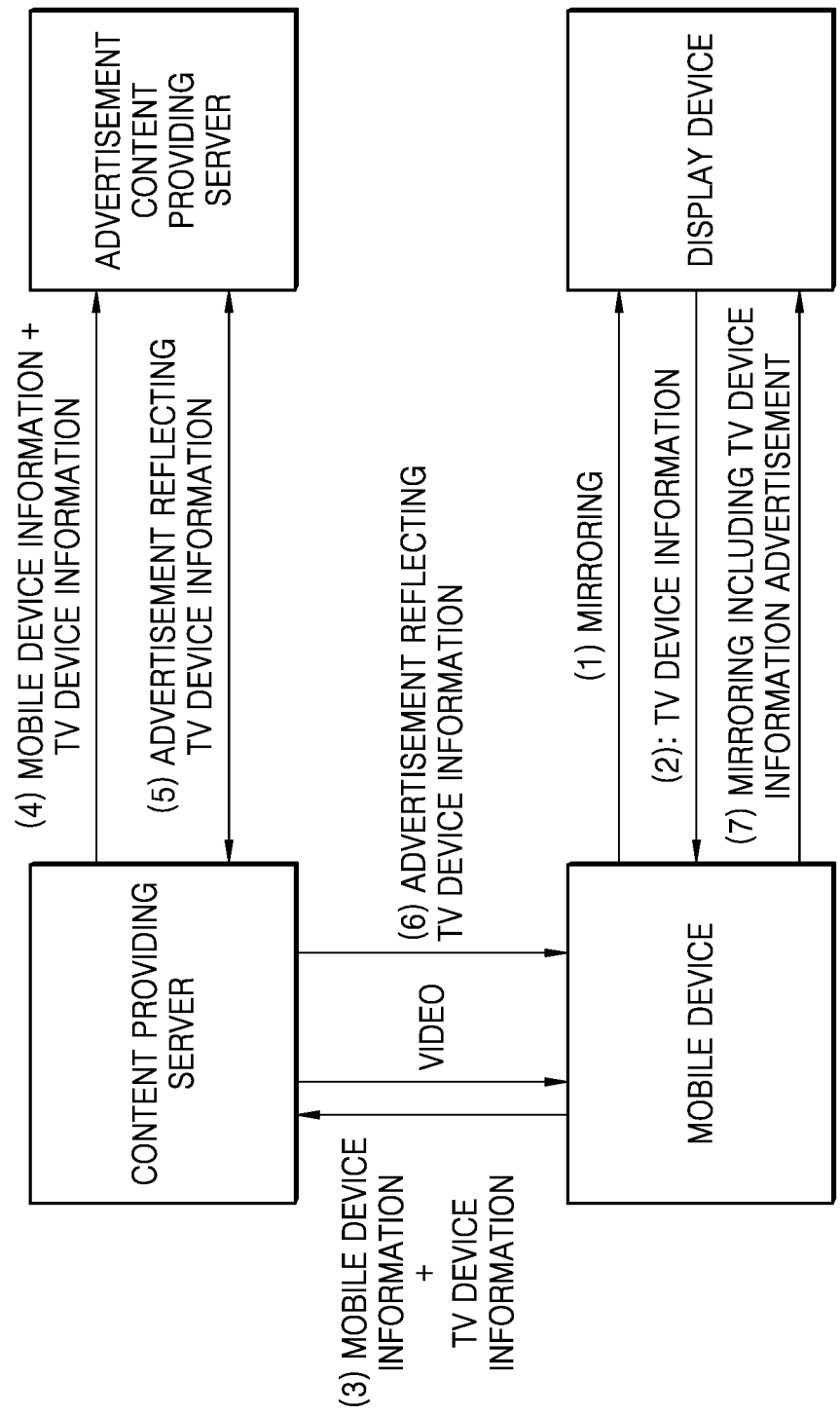
FIG. 11 illustrates a system for describing operations in a passive mode in which an electronic device passively receives a target advertisement from a content providing server, according to an embodiment of the disclosure.

FIG. 11 illustrates a system for describing operations in a passive mode in which an electronic device passively receives a target advertisement from a content providing server, according to an embodiment of the disclosure.

Figure 12:
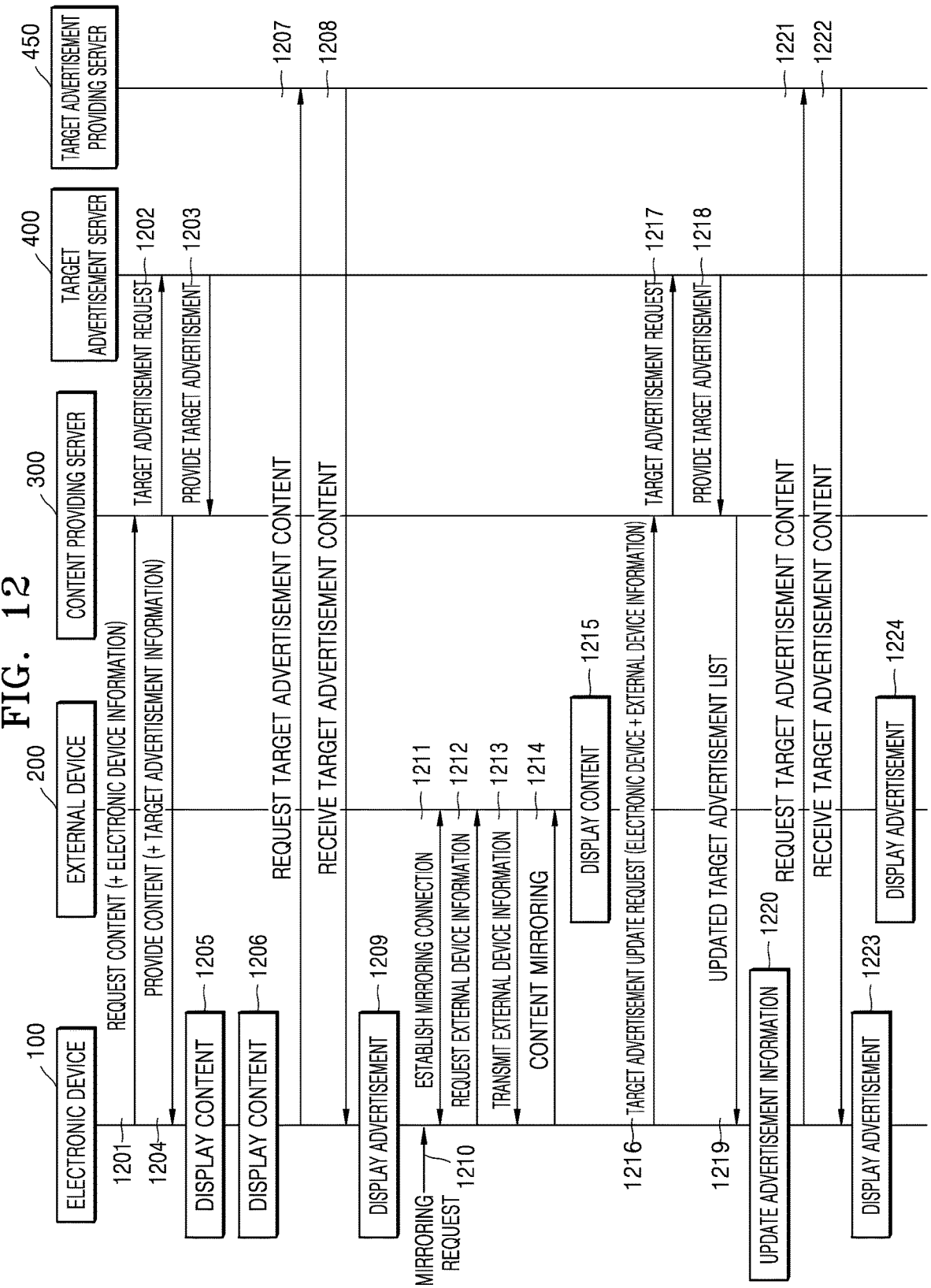
FIG. 12 illustrates a flowchart of operations in a passive mode in which an electronic device passively receives a target advertisement from a content providing server, according to an embodiment of the disclosure.

FIG. 12 illustrates a flowchart of operations in a passive mode in which an electronic device passively receives a target advertisement from a content providing server, according to an embodiment of the disclosure.

Hereinafter, a target advertisement providing method in a passive mode in which an electronic device passively receives a target advertisement from a content providing server will be described with reference to FIGS. 11 and 12. In the passive mode, the electronic device may request and receive the content from the content providing server, and in this case, the content providing server may obtain a target advertisement performed during the display of the requested content and transmit information about the target advertisement to the electronic device together with the transmission of the content. The target advertisement agent module may display the target advertisement content based on the received target advertisement information.

Referring to FIGS. 11 and 12, in operation 1201, the electronic device 100 may request the content providing server 300 for content. In this case, the electronic device 100 may provide information about the electronic device together with a content request or according to a request of the content providing server after requesting the content. The information about the electronic device may include device information of the electronic device and information about the user of the electronic device.

In operation 1202, when the electronic device 100 is authenticated through a certain authentication process, the content providing server 300 may transmit a target advertisement request together with content information and information about the electronic device to the target advertisement server 400 in order to obtain target advertisement information to be provided together with the content.

In operation 1203, the target advertisement server 400 may determine a target advertisement suitable for the user of the electronic device based on the content information and the information about the electronic device received from the content providing server 300 and provide the same to the content providing server 300. In this case, the target advertisement server 400 may make a target advertisement list including one or more target advertisements to be displayed during the play of the content and transmit the target advertisement list to the content providing server 300. For example, when four target advertisements are displayed during the play of one piece of content, the target advertisement list may include information about the four target advertisements.

In operation 1204, the content providing server 300 may provide the electronic device 100 with the target advertisement list received from the target advertisement server 400, together with the content requested by the electronic device 100.

In operation 1205, the electronic device 100 may display the content received from the content providing server 300.

In operation 1206, the electronic device 100 may store the target advertisement list received from the content providing server 300, and the target advertisement agent module of the electronic device 100 may obtain and display the target advertisement content during the display of the content based on the stored target advertisement list. The target advertisement list may include commands to insert the target advertisement content at a suitable position of the content or at a suitable time. For example, the commands may include the rules that the advertisement content should be allocated to a particular advertisement slot or, for example, in the case of Internet content, the advertisement content should be provided at a particular position on the web page representing the main content accessed by the user.

In operation 1207, the target advertisement agent module of the electronic device 100 may request the target advertisement providing server 450 for the target advertisement content based on the stored target advertisement information at the point when the target advertisement is to be displayed. For example, the target advertisement information may include target advertisement address information for accessing the target advertisement content, and the electronic device 100 may use the target advertisement address information to access the target advertisement providing server 450 to request and receive the target advertisement content.

In operation 1208, the electronic device 100 may receive the requested target advertisement content from the target advertisement providing server 450, and in operation 1209, the electronic device may display the received target advertisement content.

At some point while the electronic device 100 is playing the content, in operation 1210, the electronic device 100 may receive a screen mirroring request from the user.

In operation 1211, the electronic device 100 may establish a connection for screen mirroring with the external device 200 to which screen mirroring is requested.

In operation 1212, the electronic device 100 may request the external device 200 for information about the external device, and in operation 1213, the electronic device 100 may receive information about the external device from the external device 200. As described with reference to FIG. 6, the information about the external device may include device information about the external device and information about the user of the external device. The device information of the external device may include, for example, the country information, region information, language information, device ID, device IP, or the like set in the external device. The user information of the external device may include the external device user's viewing history, preference settings, account information, or the like and may include, for example, demographic characteristic information such as the external device user's race, economic status, gender, age, education level, income level, or employment status, psychographic characteristic information such as the external device user's value, personality, attitude, opinion, lifestyle, or interest, or characteristic information such as the external device user's browser history, purchase history, or action variables including recent actions according to the use of the external device by the user of the external device.

The request and transmission of the external device information may be performed in the mirroring connection establishment operation 1211 or may be performed in the content mirroring operation 1214.

In operation 1214, the electronic device 100 may perform screen mirroring to transmit screen data including the content output from the electronic device 100 to the external device 200, and in operation 1215, the external device 200 may display the received content.

Next, in operation 1216, because the range of users currently consuming the content is changed by screen mirroring with the external device 200, the electronic device 100 may transmit a target advertisement update request to the content providing server 300 in order to obtain a target advertisement suitable for the changed user range. At the target advertisement update request, the electronic device 100 may provide not only information about the electronic device but also information about the external device connected by screen mirroring to the content providing server 300 in order to notify the changed user range. The information about the electronic device may include device information of the electronic device and user information of the electronic device, and the information about the external device may include device information of the external device and user information of the external device. The information about the electronic device or the information about the external device may be the same as that described with reference to FIGS. 5 and 6.

In operation 1217, the content providing server 300 may transmit a target advertisement request including information about the electronic device and information about the external device to the target advertisement server 400, and in operation 1218, the target advertisement server 400 may determine one or more target advertisements based on the received information about the electronic device and the information about the external device connected by screen mirroring and transmit a target advertisement list including information about the determined one or more target advertisements to the content providing server 300.

In operation 1219, the content providing server 300 may provide an updated target advertisement list to the electronic device 100 based on the information about the electronic device and the information about the external device.

In operation 1220, the electronic device 100 may store the updated target advertisement list, and in operation 1221, the electronic device 100 may request the target advertisement providing server 450 for the target advertisement content based on the updated target advertisement information at the point when the target advertisement is to be displayed.

In operation 1222, the electronic device 100 may receive the target advertisement content from the target advertisement providing server 450, and in operation 1223, the electronic device 100 may display the target advertisement content.

In operation 1224, by screen mirroring, the external device 200 may also display the target advertisement content determined based on not only the information about the electronic device but also the information about the external device.

A particular example of operations in a passive mode in which an electronic device passively receives a target advertisement according to an embodiment of the disclosure will now be described with reference to FIG. 13.

Figure 13:
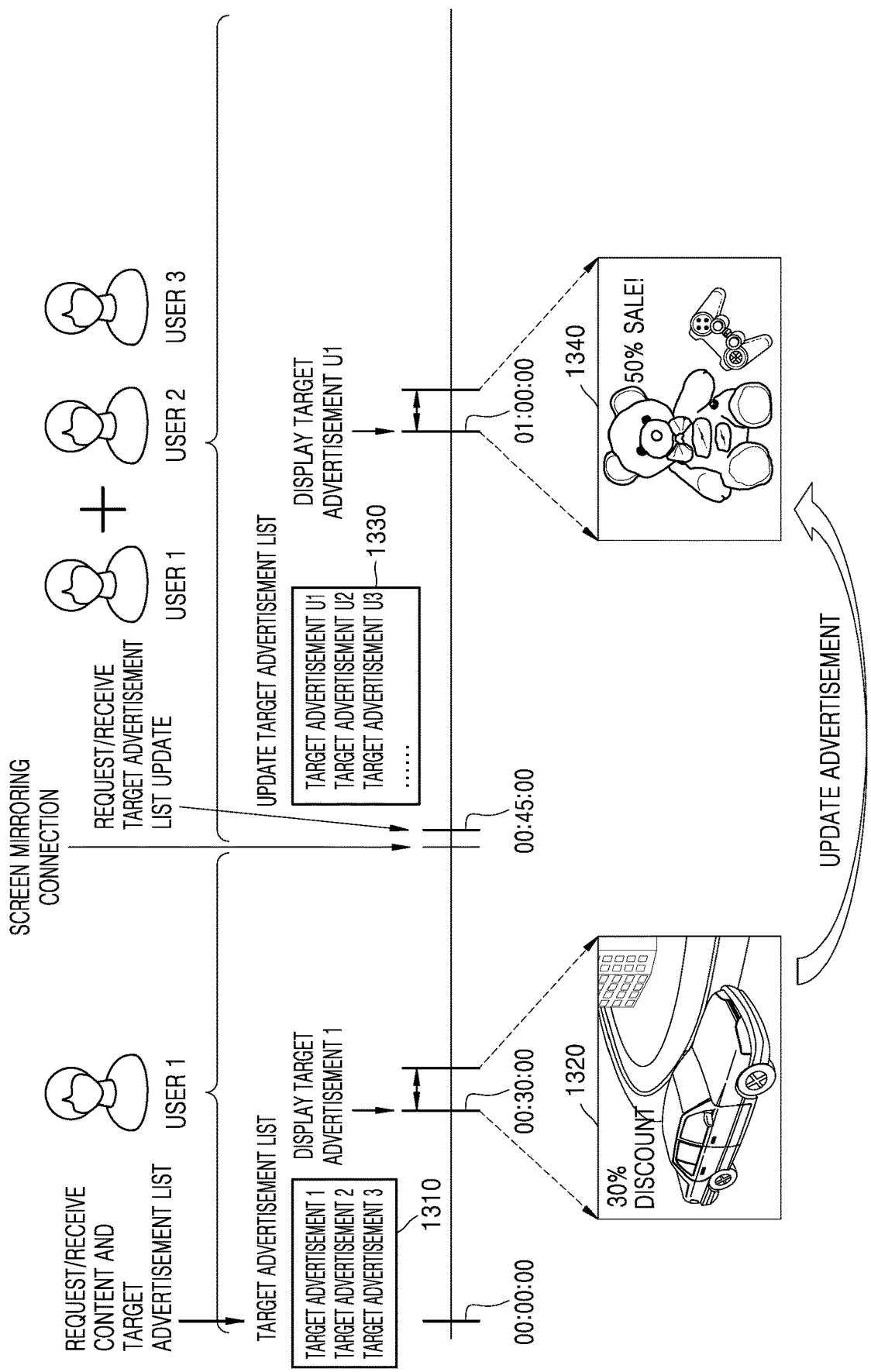
FIG. 13 illustrates a timing diagram for describing operations in a passive mode in which an electronic device passively receives a target advertisement, according to an embodiment of the disclosure.

Referring to FIG. 13, the electronic device may request content from the content providing server according to a request of the user 1. In this case, the electronic device may transmit information about the electronic device, that is, device information of the electronic device and user information of the electronic device, to the content providing server together with a content request. In the passive mode, the content providing server may request and receive a target advertisement list including one or more target advertisements to be provided during the display of the content from the target advertisement server and transmit the target advertisement list to the electronic device together with the content. A target advertisement list 1310 may be a list of one or more target advertisements to be provided during the display of the content and may include not only identification information of the target advertisement or information for accessing the target advertisement but also information about at which point the electronic device should display which target advertisement during the display of the content.

Thus, the electronic device may display a suitable target advertisement at a suitable point by using the information included in the target advertisement list 1310. For example, referring to FIG. 13, the target advertisement list 1310 may include information about a target advertisement 1, a target advertisement 2, and a target advertisement 3. For example, when the user of the electronic device is a mid-forties middle-class man, the target advertisements included in the target advertisement list may include advertisements suitable for the user's inclination, for example, a list of car advertisements or sportswear advertisements.

For example, according to the information included in the target advertisement list, for example, according to a command to display the target advertisement 1 at about 30 minutes, the electronic device may obtain target advertisement 1 content according to the information about the target advertisement 1 before the point of about 30 minutes and display the target advertisement 1 (1320) at the point of about 30 minutes.

The electronic device 100 may perform screen mirroring at some point during the display of the content such that the screen data displayed on the electronic device may be transmitted to and displayed on the external device, for example, a television. In this case, the users registered in the television may be the user 2 and the user 3, and thus, by screen mirroring, the content initially displayed on the electronic device may be viewed by the user 2 and the user 3 as well as the user 1. The electronic device 100 may receive and store device information of the television and information about the user 2 and the user 3 that are the television users by requesting the television that is the screen-mirrored external device.

By the screen mirroring, the content is being displayed not only on the electronic device viewed by the user 1 but also on the external device viewed by the user 2 and the user 3 and the range of users consuming the content is changed, and thus advertisement targeting may need to vary according to the change of the user range.

The electronic device 100 may transmit a target advertisement request including information about the electronic device 100 and information about the external device 200 to the content providing server in order to receive an updated target advertisement list. That is, a target advertisement request message transmitted by the electronic device 100 to the content providing server may include not only information about the electronic device 100 and user information of the electronic device 100 but also device information of the external device and information about the user 2 and the user 3 that are the users of the external device, and the content providing server may request the target advertisement server to select an optimal target advertisement based on not only the information about the electronic device 100 and the user information of the electronic device 100 but also the device information of the external device and the information about the user 2 and the user 3 that are the users of the external device, receive an updated target advertisement list 1330, and transmit the received updated target advertisement list 1330 to the electronic device 100.

The updated target advertisement list 1330 may include a target advertisement U1, a target advertisement U2, and a target advertisement U3. For example, when the user 2 and the user 3 using the television as the external device are children, the updated target advertisement list 1330 may include a toy advertisement, a snack advertisement, an amusement park advertisement, or the like.

Now, the electronic device 100 may display a suitable target advertisement at a suitable point by using the information included in the newly-received updated target advertisement list 1330. The electronic device 100 may access and receive the content about the target advertisement U1 by using the information about the target advertisement U1 at a certain point before 01:00:00 that is a next target advertisement display point and display a target advertisement U1 1340 at a point of 01:00:00. The target advertisement U1 may naturally be provided to the external device by screen mirroring, and thus, the external device may provide a target advertisement reflecting the user's inclination to the users, that is, the user 2 and the user 3.

As such, in embodiments of the disclosure, even when the user range is changed or expanded by screen mirroring, the optimal target advertisement may be adaptively provided in accordance with the changed or expanded users by flexibly providing information about the changed or expanded users to the content providing server.

In the above embodiments of the disclosure, it has been described that the electronic device provides the screen data displayed on the display of the electronic device to the external device during the screen mirroring; however, according to an embodiment of the disclosure, the electronic device may directly transmit the URL of the content to the external device for sharing of the content displayed by the electronic device itself.

Figure 14:
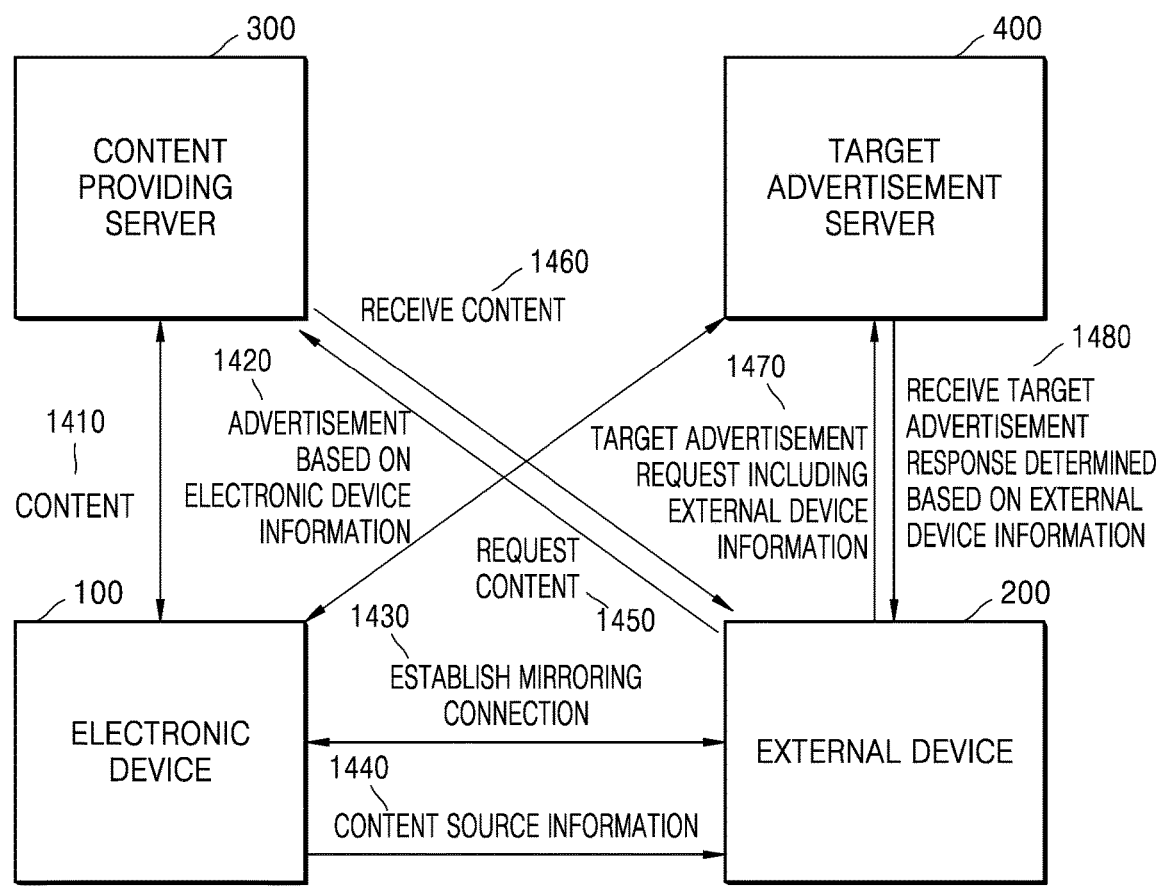
FIG. 14 is a reference diagram for describing a target advertisement providing method in a system in which an electronic device provides content source information to an external device to share content, according to an embodiment of the disclosure.

FIG. 14 is a reference diagram for describing a target advertisement providing method in a system in which an electronic device provides content source information to an external device to share content, according to an embodiment of the disclosure.

Referring to FIG. 14, the electronic device 100 may request and receive content from the content providing server 300 and display the content (1410) and may also request the target advertisement server 400 for a target advertisement to be displayed during the play of the content, receive a target advertisement targeting the electronic device, and display target advertisement content (1420).

Thereafter, at a certain point, according to a mirroring request, the electronic device 100 may establish a mirroring connection with the external device 200 (1430), and in this case, the electronic device 100 may not display the screen data displayed on its own display as it is but may provide the source information of the content displayed on its own display to the external device 200 (1440). When the electronic device 100 provides the source information of the content to the external device 200, the electronic device 100 may provide, for example, the time information of the currently played content together for seamless play.

According to an embodiment of the disclosure, the source information of the content may include a content identifier for identifying the content and content access information used to access the content and may include time information related to the play of the content as content play information. The content identifier may refer to information for identifying the content, such as the name of the content being played by the electronic device 100, and may be represented by a program ID or the like. The content access information may be information used to access the content and may be position information of the content, such as URL, an identifier of a content providing server providing the content, or an identifier of a content providing application providing the content. The content play information may be time information related to the content being played by the electronic device 100 and may include a total play time and a play progress time of the content. The total play time of the content may represent the time taken to play all the content, and the play progress time may represent the time that elapsed to the current point from the start of playing the content. By using the play progress time, the external device 200 may determine in real time how much of the content has been played.

The external device 200 that has received the content source information as such may use the content identifier and the content access information to access the content providing server 300 to request the content (1450) and may receive the content from the content providing server 300 (1460). Also, the external device 200 may determine a point at which the content should be played, by using the content play information, and may play the content from the point.

Next, the external device 200 may transmit a target advertisement request including device information of the external device to the target advertisement server 400 in order to receive a target advertisement to be displayed during the play of the content (1470), and the target advertisement server 400 may determine a target advertisement based on the device information of the external device and then transmit a target advertisement response determined based on the device information of the external device to the external device 200 (1480).

For example, when a father views content by using the electronic device 100 and provides the content to the external device 200 by mirroring and children view content by using the external device 200, the electronic device 100 may receive a target advertisement based on the device information of the electronic device and the external device 200 may receive and display a target advertisement based on the device information of the external device. For example, the electronic device 100 may display a car advertisement or a sportswear advertisement targeting mid-forties men, and the external device 200 may display a toy advertisement or a snack advertisement targeting children.

In the example illustrated in FIG. 8, because a target advertisement request may be made only through the electronic device, both the electronic device and the external device may display the target advertisement commonly targeting the user of the electronic device and the user of the external device after the screen mirroring; however, in the example illustrated in FIG. 14, because the external device 200 connected by mirroring may receive the content source information, directly request and receive the content, and also directly request and receive the target advertisement, the external device 200 may request the target advertisement based on only the user information of the external device 200 when requesting the target advertisement server 400 for the target advertisement. Thus, in the example illustrated in FIG. 14, even when the same content is displayed on the electronic device 100 and the external device 200 by content sharing, because the electronic device 100 may display the target advertisement targeting the user of the electronic device 100 and the external device 200 may display the target advertisement targeting the user of the external device 200, the target advertisement suitable for each device user may be more finely provided.

Figure 15:
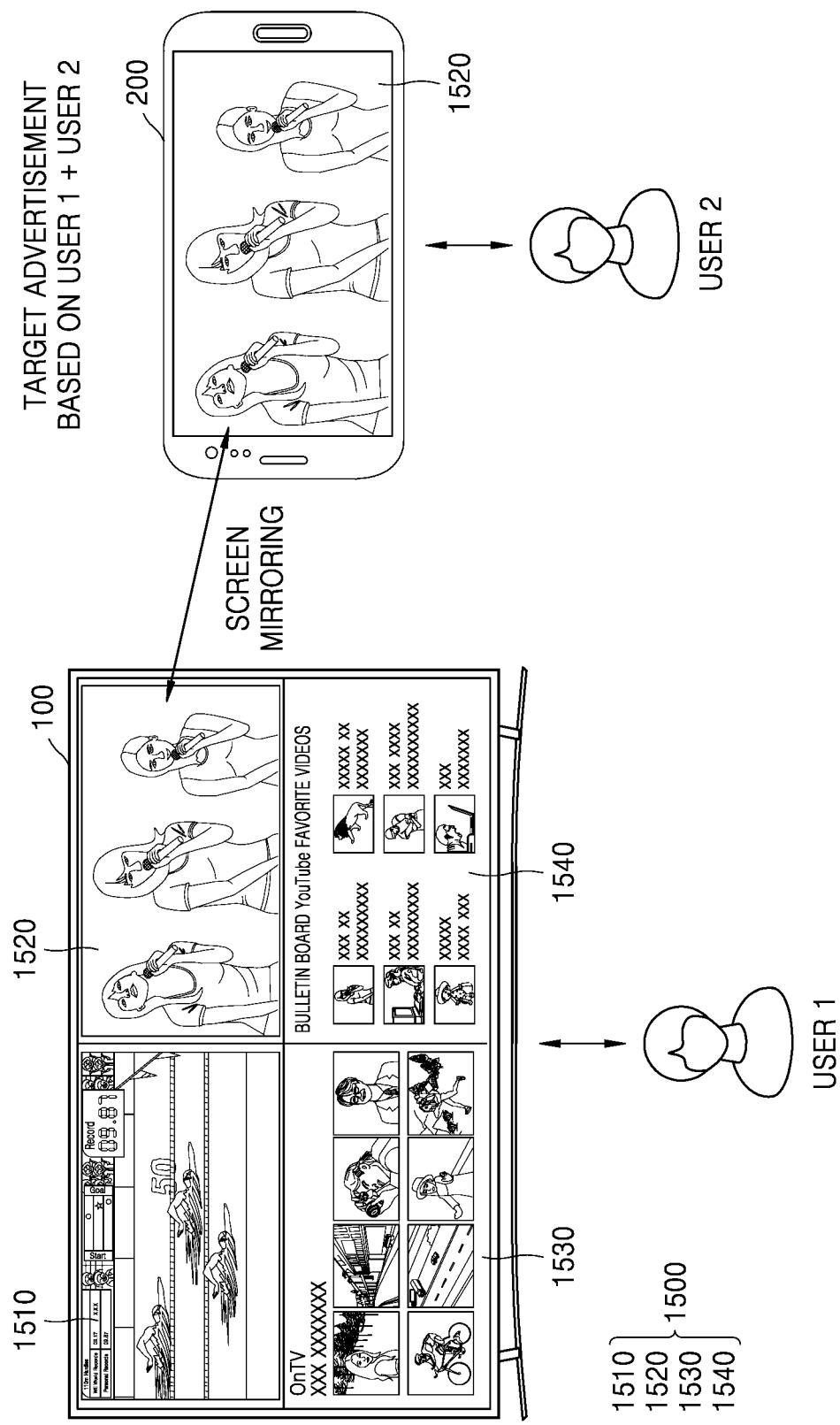
FIG. 15 is a reference diagram for describing a target advertisement providing method in a case where some screens of an electronic device implementing a multi screen including a plurality of screens are screen-mirrored, according to an embodiment of the disclosure.

FIG. 15 is a reference diagram for describing a target advertisement providing method in a case where some screens of an electronic device implementing a multi screen including a plurality of screens are screen-mirrored, according to an embodiment of the disclosure.

Referring to FIG. 15, the electronic device 100 (e.g., a display device) may divide the display into multiple screens and display content through a multi screen 1500. The content displayed on each screen constituting the multi screen may be independently provided. The multi screen 1500 may include a first screen 1510, a second screen 1520, a third screen 1530, and a fourth screen 1540. The electronic device 100 may access each content providing server to receive and display the content corresponding to each screen constituting the multi screen and may also access a separate target advertisement server to obtain the target advertisement to be provided during the display of the content.

For example, the electronic device 100 may output the content displayed on the second screen 1520 to the external device 200 (e.g., a smartphone) by screen mirroring. In this case, because the content provided on each screen of the multi screen is independent, the electronic device 100 may receive information about the external device 200 from the external device 200 connected by screen mirroring and provide information about the electronic device 100 and information about the external device 200 to a target providing server corresponding to the content displayed on the second screen 1520 to receive the target advertisement targeting the user (e.g., the user 1) of the electronic device 100 and the user (e.g., the user 2) of the external device 200. Also, the electronic device 100 may provide the received target advertisement to the external device 200 by screen mirroring.

Figure 16:
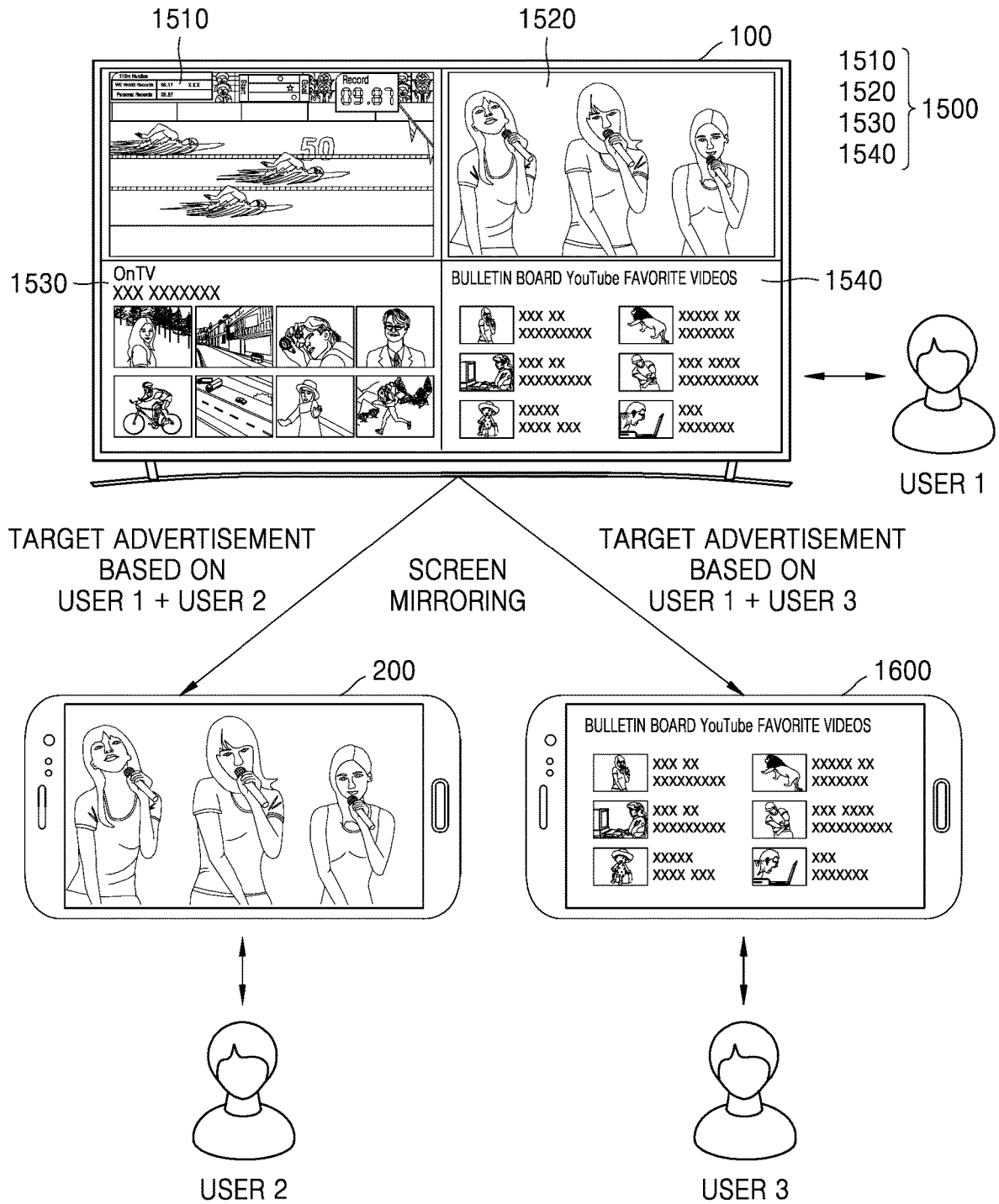
FIG. 16 is a reference diagram for describing a target advertisement providing method in a case where some screens of an electronic device implementing a multi screen including a plurality of screens are screen-mirrored, according to an embodiment of the disclosure.

FIG. 16 is a reference diagram for describing a target advertisement providing method in a case where some screens of an electronic device implementing a multi screen including a plurality of screens are screen-mirrored, according to an embodiment of the disclosure.

Referring to FIG. 16, the electronic device 100 (e.g., a display device) may divide the display into multiple screens and display content through a multi screen 1500. The content displayed on each screen constituting the multi screen may be independently provided. The multi screen 1500 may include a first screen 1510, a second screen 1520, a third screen 1530, and a fourth screen 1540. The electronic device 100 may access each content providing server to receive and display the content corresponding to each screen constituting the multi screen and may also access a separate target advertisement server to obtain the target advertisement to be provided during the display of the content.

For example, the electronic device 100 may output the content displayed on the second screen 1520 to the external device 200 (e.g., a smartphone) by screen mirroring and may output the content displayed on the fourth screen 1540 to an external device 1600 (e.g., a smartphone) by screen mirroring.

In this case, because the content provided on each screen of the multi screen is independent, the electronic device 100 may receive information about the external device 200 from the external device 200 connected by screen mirroring and provide information about the electronic device 100 and information about the external device 200 to a target providing server corresponding to the content displayed on the second screen 1520 to receive the target advertisement targeting the user (e.g., the user 1) of the electronic device 100 and the user (e.g., the user 2) of the external device 200. Also, the electronic device 100 may provide the received target advertisement to the external device 200 by screen mirroring.

Likewise, as for the fourth screen 1540, the electronic device 100 may receive information about the external device 1600 from the external device 1600 connected by screen mirroring and provide information about the electronic device 100 and information about the external device 1600 to a target providing server corresponding to the content displayed on the fourth screen 1540 to receive the target advertisement targeting the user (e.g., the user 1) of the electronic device 100 and the user (e.g., the user 3) of the external device 1600. Also, the electronic device 100 may provide the received target advertisement to the external device 1600 by screen mirroring. As such, even in a situation where screen mirroring is separately performed on each of a plurality of terminals, the electronic device 100 may provide information of each external device connected by screen mirroring to the target advertisement server to obtain the target advertisement, thereby providing the target advertisement optimized for the user of each terminal.

Figure 17:
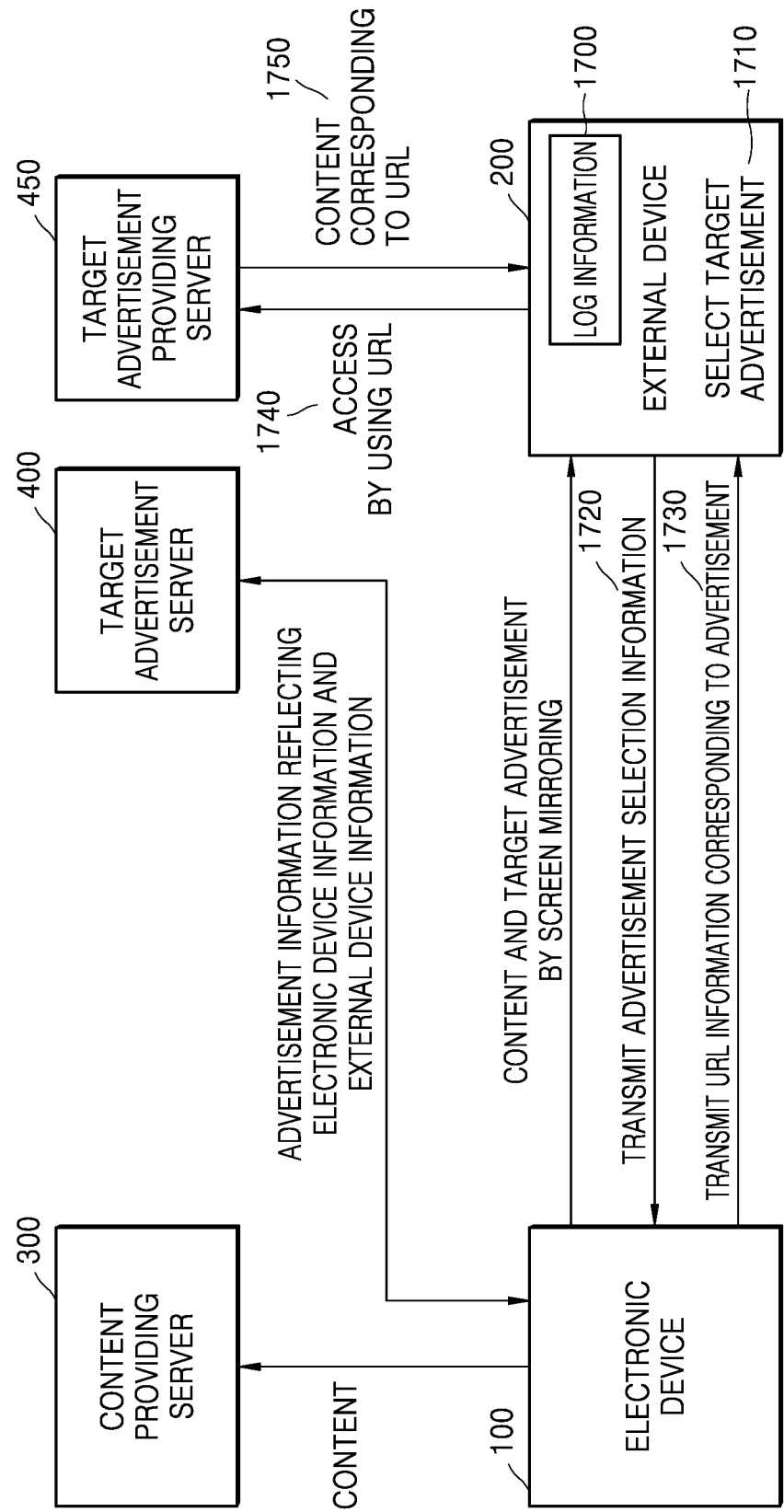
FIG. 17 is a reference diagram for describing operations when selecting a target advertisement displayed on an external device, in the external device that receives and outputs screen data from an electronic device by screen mirroring, according to an embodiment of the disclosure.

FIG. 17 is a reference diagram for describing operations when selecting a target advertisement displayed on an external device, in the external device that receives and outputs screen data from an electronic device by screen mirroring, according to an embodiment of the disclosure.

Referring to FIG. 17, as described above with reference to FIG. 8, the electronic device 100 and the external device 200 may perform a screen mirroring connection, and the electronic device 100 may output the target advertisement targeting the user of the electronic device 100 and the user of the external device 200 to the external device 200.

The target advertisement content displayed on the external device 200 may be an advertisement that itself includes only audio/visual content and is only unidirectionally displayed to the user, but may also be in the form of providing interactive content. For example, the target advertisement content may provide a brief content in a banner type, and when the user selects this banner-type target advertisement content, the URL corresponding to the target advertisement content may be accessed to provide the target advertisement content with additional content, more detailed content, or content including purchase-related items.

Also, when the user tries to operate the target advertisement content in the external device provided with the content by screen mirroring by using a remote controller or an input unit of the external device, it may be determined that the user wants a target advertisement content-related operation in the external device. Thus, in this case, a target advertisement content-related control and operation may be performed in the external device 200.

Thus, upon receiving a user's target advertisement content selection input (1710), the external device 200 may transmit coordinate information corresponding to the selection input on the content display screen to the electronic device 100 (1720).

The electronic device 100 may determine an item corresponding to the coordinate information received from the external device 200 and transmit information corresponding to the determined item to the external device 200. For example, when the item corresponding to the coordinate information received from the external device 200 is an item for accessing detailed information of the target advertisement content, the electronic device 100 may provide address information related to the item, that is, a URL for accessing the detailed information, to the external device 200 (1730).

The external device 200 that has received information corresponding to the item corresponding to the coordinate information from the electronic device 100, for example, a URL, may access the target advertisement providing server 450 by using the received URL or the like (1740) and may receive content (1750) corresponding to the URL from the target advertisement providing server 450 and display the received content.

As such, even in the case of the external device 200 receiving a screen by screen mirroring, an operation corresponding to a user interaction on the received screen may be directly performed in the external device 200 to increase the convenience of the user actually using the external device 200, and also, information generated according to an action of the user of the external device 200, for example, log information 1700 of the accessed URL, may be recorded in the external device 200 to more accurately collect information about the user of the external device 200.

The term "module" used herein may include a unit including hardware, software, or firmware and may be interchangeable with, for example, a term such as logic, logic block, component, or circuit. The "module" may be an integrated component or a portion or a minimum unit of the integrated component that performs one or more functions. The "module" may be mechanically or electronically implemented and may include, for example, known or future application-particular integrated circuit (ASIC) chips, field programmable gate arrays (FPGAs), or programmable logic devices. At least a portion of the device (e.g., modules or functions thereof) or the method (e.g., operations) according to various embodiments of the disclosure may be implemented as an instruction stored in a computer-readable storage medium (e.g., the memory 110) in the form of a program module. When the instruction is executed by a processor (e.g., the processor 120), the processor may perform a function corresponding to the instruction.

Some embodiments may also be implemented in the form of computer-readable recording mediums including instructions executable by computers, such as program modules executed by computers. The computer-readable recording mediums may be any available mediums accessible by computers and may include volatile or non-volatile mediums and removable or non-removable mediums. Also, the computer-readable recording mediums may include computer-readable storage mediums. The computer-readable storage mediums may include both volatile or non-volatile and removable and non-removable mediums implemented by any method or technology for storage of information such as computer-readable instructions, data structures, program modules, or other data.

The embodiments of the disclosure may be implemented as S/W programs including instructions stored in computer-readable storage mediums. The computers may be devices capable of calling the stored instructions from the storage mediums and performing the operations according to the embodiments of the disclosure according to the called instructions and may include the electronic devices according to the embodiments of the disclosure. The computer-readable storage mediums may be provided in the form of non-transitory storage mediums. Here, 'non-transitory' may merely mean that the storage mediums do not include signals and are tangible, but does not distinguish semi-permanent or temporary storage of data in the storage mediums.

Also, the control method according to the embodiments of the disclosure may be included and provided in a computer program product. The computer program product may be traded as a product between a seller and a buyer.

The computer program product may include an S/W program and a computer-readable storage medium with an S/W program stored therein. For example, the computer program product may include products in the form of S/W programs (e.g., downloadable apps) electronically distributed through device manufacturers or electronic markets (e.g., Google Play Store and App Store). For electronic distribution, at least a portion of the S/W program may be stored in a storage medium or may be temporarily generated. In this case, the storage medium may be a storage medium of a server of a manufacturer, a server of an electronic market, or a relay server for temporarily storing the S/W program.

In a system including a server and a device, the computer program product may include a storage medium of the server or a storage medium of the device. Alternatively, when there is a third device (e.g., a smartphone) communicatively connected to the server or the device, the computer program product may include a storage medium of the third device. Alternatively, the computer program product may include the S/W program itself that is transmitted from the server to the device or the third device or transmitted from the third device to the device.

In this case, one of the server, the device, and the third device may execute the computer program product to perform the method according to the embodiments of the disclosure. Alternatively, two or more of the server, the device, and the third device may execute the computer program product to perform the method according to the embodiments of the disclosure in a distributed manner.

For example, the server (e.g., a cloud server or an artificial intelligence server) may execute the computer program product stored in the server, to control the device communicatively connected to the server to perform the method according to the embodiments of the disclosure.

As another example, the third device may execute the computer program product to control the device communicatively connected to the third device to perform the method according to the embodiments of the disclosure. When the third device executes the computer program product, the third device may download the computer program product from the server and execute the downloaded computer program product. Alternatively, the third device may perform the method according to the embodiments of the disclosure by executing the computer program product provided in a preloaded state.

Also, herein, the "unit" may include a hardware component such as a processor or a circuit, and/or a software component executed by a hardware component such as a processor.

According to the embodiments of the disclosure, by providing target advertisements by actively reflecting the users' content viewing environments, more suitable target advertisements may be provided to the users and the advertising effect thereof may be maximized accordingly.

The foregoing is illustrative of embodiments of the disclosure, and those of ordinary skill in the art will readily understand that various modifications may be made therein without materially departing from the spirit or features of the disclosure. Therefore, it is to be understood that the embodiments of the disclosure described above should be considered in a descriptive sense only and not for purposes of limitation. For example, each component described as a single type may also be implemented in a distributed manner, and likewise, components described as being distributed may also be implemented in a combined form.

The scope of the disclosure should be defined not by the above detailed description but by the following claims, and all modifications or differences within the scope should be construed as being included in the scope of the disclosure.

What is claimed is:

1. An electronic device comprising:
a communication interface;
a memory storing one or more instructions; and
a processor configured to execute the one or more instructions stored in the memory to:

display a content screen on a display of the electronic device based on content data received from an external server;

transmit information about the electronic device to the external server for a target advertisement, the information about the electronic device including information about a first user of the electronic device;

receive, from the external server, first target advertisement information for the first user of the electronic device, which is determined by the external server based on the information about the electronic device and display a first target advertisement corresponding to the received first target advertisement information on the display;

establish a wireless communication for screen mirroring between the electronic device and an external device via the communication interface and perform the screen mirroring with the external device using the established wireless communication such that at least a portion of the content screen is displayed on the external device;

based on performing the screen mirroring, transmit, to the external server, information about the external device connected to the electronic device by the screen mirroring, the information about the external device including information about a second user of the external device, and the first user being different from the second user;

receive, from the external server, second target advertisement information for the second user of the external device, which is determined by the external server based on the information about the external device; and display a second target advertisement corresponding to the received second target advertisement information on the display while performing the screen mirroring such that the second target advertisement is displayed on the external device.

2. The electronic device of claim 1, wherein the processor is further configured to execute the one or more instructions to transmit the information about the electronic device to the external server in addition to the information about the external device, and wherein the second target advertisement information is determined based on the information about the electronic device in addition to the information about the external device.

3. The electronic device of claim 1, wherein the information about the electronic device further includes device information of the electronic device, and wherein the information about the external device further includes device information of the external device.

4. The electronic device of claim 3, wherein each of the information about the first user of the electronic device and the information about the second user of the external device includes at least one of viewing history information, preference information, or user account information, and wherein each of the device information of the electronic device and the device information of the external device includes at least one of country information, language information, device identification (ID), or Internet protocol (IP) information.

5. The electronic device of claim 1, wherein the second target advertisement information includes information for accessing target advertisement content targeting the second user of the external device, and wherein the processor is further configured to execute the one or more instructions to access a server providing the target advertisement content by using the information for accessing the target advertisement content and receive the target advertisement content from the server providing the target advertisement content.

6. The electronic device of claim 1, wherein the external server includes a target advertisement server providing the first target advertisement information and the second target advertisement information independently from a content providing server providing the content.

7. The electronic device of claim 1, wherein the external server includes a content providing server providing the content data.

8. The electronic device of claim 1, wherein the processor is further configured, to execute the one or more instructions to transmit, when the external device connected by the screen mirroring is changed, information about the changed external device to the external server.

9. The electronic device of claim 1, wherein the processor is further configured to execute the one or more instructions to:

transmit a content screen including the second target advertisement based on the second target advertisement information to the external device by the screen mirroring;

receive a user input for selecting an item related to the second target advertisement based on the second target advertisement information from the external device; and transmit information for providing a result corresponding to the user input to the external device.

10. A system for providing a target advertisement, the system comprising:

a first device;

a second device; and a target advertisement server, wherein the first device is configured to:

display a content screen on a display of the first device based on content data received from a content providing server, transmit information about the first device to the target advertisement server, the information about the first device including information about a first user of the first device, receive, from target advertisement server, first target advertisement information for the first user of the first device, which is determined by the target advertisement server based on the information about the first device and display a first target advertisement corresponding to the received first target advertisement information on the display, establish a wireless communication for screen mirroring between the first device and the second device and perform the screen mirroring with the second device using the established wireless communication such that at least a portion of the content screen is displayed on the second device, based on performing the screen mirroring, transmit, to the target advertisement server, information about the second device connected to the first device by the screen mirroring, the information about the second device including information about a second user of the second device, and the first user being different from the second user, receive, from the target advertisement server, second target advertisement information for the second user of the second device, which is determined by the target advertisement server, based on the information about the second device; and display a second target advertisement corresponding to the received second target advertisement information on the display while performing the screen mirroring such that the second target advertisement is displayed on the second device, wherein the second device is configured to receive the content screen from the first device and display the content screen by the screen mirroring, and wherein the target advertisement server is further configured to determine the first target advertisement information based on the information about the first device and determine the second target advertisement information based on the information about the second device.

11. The system of claim 10, wherein the first device is further configured to display the first target advertisement at an advertisement display point during execution of the content data, and transmit the content screen including the displayed first target advertisement to the second device by the screen mirroring.

12. The system of claim 10, wherein the second device is further configured to display the content screen including the first target advertisement received from the first device by the screen mirroring, receive a user input for selecting an item related to the first target advertisement, transmit a signal corresponding to the user input to the first device, receive information for providing a result corresponding to the user input from the first device, and perform an operation corresponding to the user input by using the information.

13. A method of operating an electronic device, the method comprising:

displaying a content screen on a display of the electronic device based on content data received from an external server;

transmitting information about the electronic device to the external server for a target advertisement, the information about the electronic device including information about a first user of the electronic device;

receiving, from the external server, first target advertisement information for the first user of the electronic device, which is determined by the external server based on the information about the electronic device and displaying a first target advertisement corresponding to the received first target advertisement information on the display;

establishing a wireless communication for screen mirroring between the electronic device and an external device and performing the screen mirroring with the external device using the established wireless communication such that at least a portion of the content screen is displayed on the external device;

based on performing the screen mirroring, transmitting, to the external server, information about the external device connected to the electronic device by the screen mirroring, the information about the external device including information about a second user of the electronic device, and the first user being different from the second user;

receiving, from the external server, second target advertisement information for the second user of the external device, which is determined by the external server based on the information about the external device; and displaying a second target advertisement corresponding to the received second target advertisement information on the display while performing the screen mirroring such that the second target advertisement is displayed on the external device.

14. The method of claim 13, wherein the second target advertisement information is determined based on the information about the electronic device in addition to the information about the external device.

15. The method of claim 13, wherein the information about the electronic device further includes device information of the electronic device, and wherein the information about the external device further includes device information of the external device.

16. The method of claim 15, wherein each of the information about the first user of the electronic device and the information about the second user of the external device includes at least one of viewing history information, preference information, or user account information, and wherein each of the device information of the electronic device and the device information of the external device includes at least one of country information, language information, device identification (ID), or Internet protocol (IP) information.

17. The method of claim 13, wherein the second target advertisement information includes information for accessing target advertisement content targeting the second user of the external device, and wherein the method further comprises accessing a server providing the target advertisement content by using the information for accessing the target advertisement content and receiving the target advertisement content from the server providing the target advertisement content.

18. The method of claim 13, wherein the external server includes a target advertisement server configured to provide the first target advertisement information and the second target advertisement information independently from a content providing server configured to provide the content or includes a content providing server configured to provide the content.

19. The method of claim 13, further comprising:

transmitting content screen including the second target advertisement based on the second target advertisement information to the external device by the screen mirroring;

receiving a user input for selecting an item related to the second target advertisement based on the second target advertisement information from the external device; and transmitting information for providing a result corresponding to the user input to the external device.

20. A computer program product comprising a non-transitory computer-readable recording medium having recorded thereon a program for performing a method of operating an electronic device, the method comprising:

displaying a content screen on a display of the electronic device based on content data received from an external server;

transmitting information about the electronic device to the external server for a target advertisement, the information about the electronic device including information about a first user of the electronic device;

receiving, from the external server, first target advertisement information for a first user of the electronic device, which is determined by the external server based on the information about the electronic device and displaying a first target advertisement corresponding to the received first target advertisement information on the display;

establishing a wireless communication for screen mirroring between the electronic device and an external device and performing the screen mirroring with the external device using the established wireless communication such that at least a portion of the content screen is displayed on the external device;

based on performing the screen mirroring, transmitting, to the external server, the information about the external device connected to the electronic device by the screen mirroring, the information about the external device including information about a second user of the external device, and the first user being different from the second user;

receiving, from the external server, second target advertisement information for a second user of the external device, which is determined by the external server based on the information about the external device; and displaying a second target advertisement corresponding to the received second target advertisement information on the display while performing the screen mirroring such that the second target advertisement is displayed on the external device.

21. The electronic device of claim 1, wherein a plurality of users are registered in the external device, the plurality of users including the second user and being different from the first user, and wherein the information about the external device includes information about each of the plurality of users, and the second target advertisement information is determined by the external server based on the information about the first user and the information about each of the plurality of users.

22. The system of claim 10, wherein a plurality of users are registered in the second device, the plurality of users including the second user and being different from the first user, and wherein the information about the second device includes information about each of the plurality of users, and the second target advertisement information is determined by the target advertisement server based on the information about the first user and the information about each of the plurality of users.

23. The method of claim 13, wherein a plurality of users are registered in the external device, the plurality of users including the second user and being different from the first user, and wherein the information about the external device includes information about each of the plurality of users, and the second target advertisement information is determined by the external server based on the information about the first user and the information about each of the plurality of users.

24. The computer program product of claim 20, wherein a plurality of users are registered in the external device, the plurality of users including the second user and being different from the first user, and wherein the information about the external device includes information about each of the plurality of users, and the second target advertisement information is determined by the external server based on the information about the first user and the information about each of the plurality of users.

25. The electronic device of claim 1, wherein the processor is further configured to execute the one or more instructions to:

receive the content data and target advertisement information from the external server, wherein the target advertisement information includes a command for inserting a target advertisement content corresponding to the target advertisement information at a specific position in a content of the content data, and display the content screen on the display based on the command so that the target advertisement content is provided at the specific position in the content on the content screen.

26. The system of claim 10, wherein the first device is further configured to:

receive the content data and target advertisement information from the content providing server, wherein the target advertisement information includes a command for inserting a target advertisement content corresponding to the target advertisement information at a specific position in a content of the content data, and display the content screen on the display based on the command so that the target advertisement content is provided at the specific position in the content on the content screen.

27. The method of claim 13, further comprising receiving the content data and target advertisement information from the external server, wherein the target advertisement information includes a command for inserting a target advertisement content corresponding to the target advertisement information at a specific position in a content of the content data, and wherein the displaying of the content screen comprises displaying the content screen on the display based on the command so that the target advertisement content is provided at the specific position in the content on the content screen.

28. The computer program product of claim 20, wherein the method further comprises receiving the content data and target advertisement information from the external server, wherein the target advertisement information includes a command for inserting a target advertisement content corresponding to the target advertisement information at a specific position in a content of the content data, and wherein the displaying of the content screen comprises displaying the content screen on the display based on the command so that the target advertisement content is provided at the specific position in the content on the content screen.

* * * * *